US011637433B2

(12) United States Patent
Yamaguchi et al.

(10) Patent No.: US 11,637,433 B2
(45) Date of Patent: Apr. 25, 2023

(54) BATTERY PACK AND ELECTRICAL APPARATUS

(71) Applicant: Koki Holdings Co., Ltd., Tokyo (JP)

(72) Inventors: Satoshi Yamaguchi, Ibaraki (JP); Yasushi Nakano, Ibaraki (JP); Hiroyuki Hanawa, Ibaraki (JP); Kazuhiko Funabashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 348 days.

(21) Appl. No.: 16/638,757

(22) PCT Filed: Jul. 27, 2018

(86) PCT No.: PCT/JP2018/028262
§ 371 (c)(1),
(2) Date: Feb. 13, 2020

(87) PCT Pub. No.: WO2019/035338
PCT Pub. Date: Feb. 21, 2019

(65) Prior Publication Data
US 2020/0227931 A1 Jul. 16, 2020

(30) Foreign Application Priority Data
Aug. 14, 2017 (JP) .............................. JP2017-156314
Aug. 14, 2017 (JP) .............................. JP2017-156315

(51) Int. Cl.
*H01M 10/44* (2006.01)
*H02J 7/00* (2006.01)
*H01M 10/48* (2006.01)

(52) U.S. Cl.
CPC ....... *H02J 7/00306* (2020.01); *H01M 10/441* (2013.01); *H01M 10/443* (2013.01);
(Continued)

(58) Field of Classification Search
None
See application file for complete search history.

(56) References Cited

U.S. PATENT DOCUMENTS 5,939,856 A 8/1999 Demuro et al.

FOREIGN PATENT DOCUMENTS

| CN | 105009401 | 10/2015 |
| JP | H04147076 | 5/1992 |

(Continued)

OTHER PUBLICATIONS

"Search Report of Europe Counterpart Application", dated Mar. 15, 2021, pp. 1-7.

(Continued)

*Primary Examiner* — Raymond Alejandro
(74) *Attorney, Agent, or Firm* — JCIPRNET

(57) ABSTRACT

Provided are a battery pack and an electrical apparatus by which information can be transmitted at an appropriate timing from the battery pack to a device body. A battery pack (10) includes: a serial communication reception circuit (31) and a temperature information transmission circuit (32); an LS terminal that is selectively connected to the serial communication reception circuit (31) or the temperature information transmission circuit (32); a first switching circuit (21) that is provided between the LS terminal and the serial communication reception circuit (31) and the temperature information transmission circuit (32); and a V terminal that is connected to the first switching circuit (21). The first switching circuit (21) switches between connecting the serial communication reception circuit (31) or the temperature information transmission circuit (32) to the LS terminal according to a signal inputted from the V terminal.

19 Claims, 16 Drawing Sheets

(52) U.S. Cl.
CPC ....... *H01M 10/448* (2013.01); *H01M 10/482* (2013.01); *H01M 10/486* (2013.01); *H02J 7/0034* (2013.01); *H02J 7/00036* (2020.01); *H02J 7/00309* (2020.01)

(56) References Cited

FOREIGN PATENT DOCUMENTS

| JP | 2005235676 | 9/2005 | | |
| JP | 2007104745 | 4/2007 | | |
| JP | 2008206272 | 9/2008 | | |
| JP | 2008278745 | 11/2008 | | |
| JP | 2009037760 | 2/2009 | | |
| JP | 2009118440 | 5/2009 | | |
| JP | 2011055620 | 3/2011 | | |
| JP | 2011211861 | 10/2011 | | |
| JP | 2012060833 | 3/2012 | | |
| JP | 2012181043 | 9/2012 | | |
| JP | 2013050358 | 3/2013 | | |
| JP | 2013106372 | 5/2013 | | |
| JP | 2014072945 | 4/2014 | | |
| JP | 2014073020 | 4/2014 | | |
| JP | 2014079091 | 5/2014 | | |
| JP | 2014103717 | 6/2014 | | |
| JP | 2014144699 | 8/2014 | | |
| JP | 2015133887 | 7/2015 | | |
| JP | 2011-55620 | * 3/2017 | ............... | B60L 3/00 |
| WO | 2010029942 | 3/2010 | | |
| WO | 2014050152 | 4/2014 | | |
| WO | 2016006152 | 1/2016 | | |
| WO | 2017043248 | 3/2017 | | |

OTHER PUBLICATIONS

"Office Action of China Counterpart Application" with English translation thereof, dated Mar. 31, 2022, p. 1-p. 11.

"International Search Report (Form PCT/ISA/210) of PCT/JP2018/028262," dated Oct. 30, 2018, with English translation thereof, pp. 1-14.

Office Action of Japan Counterpart Application, with English translation thereof, dated Apr. 20, 2021, pp. 1-12.

"Office Action of Eurpoe Counterpart Application", dated Jun. 27, 2022, p. 1-p. 5.

"Office Action of China Counterpart Application" with English translation thereof, dated Feb. 4, 2023, p. 1-p. 13.

* cited by examiner

BATTERY PACK AND ELECTRICAL APPARATUS

CROSS-REFERENCE TO RELATED APPLICATION

This application is a 371 application of the International PCT application serial no. PCT/JP2018/028262, filed on Jul. 27, 2018, which claims the priority benefits of Japan Patent Application No. 2017-156314, filed on Aug. 14, 2017 and Japan Patent Application No. 2017-156315, filed on Aug. 14, 2017. The entirety of each of the above-mentioned patent applications is hereby incorporated by reference herein and made a part of this specification.

TECHNICAL FIELD

The present invention relates to a battery pack and an electrical apparatus such as an electric tool to which the battery pack can be connected. The present invention also relates to a battery pack having a communication function that can be connected to an electrical apparatus, and an electrical apparatus that performs communication between the battery pack and a device body.

BACKGROUND ART

Patent Literature 1 below discloses a battery pack to which various functions (for example, a function for communication with a charging device) are added by a microcomputer built into the battery pack, and a charging device corresponding to the battery pack. When the battery pack is mounted in the charging device, the microcomputer of the battery pack outputs a pulse signal indicating charging conditions of a battery set to the charging device, and the charging device performs charging of the battery set on the basis of the charging conditions. Further, in general, the battery pack has an overdischarge protection function and stops supply of a current when the battery pack enters an overdischarge (low voltage) state. On the other hand, a body of the electrical apparatus connected to the battery pack may also have an overdischarge protection function for a battery pack, and a voltage value at which it is determined that the battery pack is overdischarged is set for each electrical apparatus (Patent Literature 2.

CITATION LIST

Patent Literature

Patent Literature 1

Japanese Patent Laid-Open No. 2014-72945

Patent Literature 2

Japanese Patent Laid-Open No. 2011-211861

SUMMARY OF INVENTION

Technical Problem

For a timing of signal transmission from a battery pack to a device body, a time immediately after the battery pack is connected to a device body is not always optimal. Since an optimal timing varies depending on a type of device body, it is difficult for the optimal timing to be specified by the battery pack side. Further, a voltage at which the body of the electrical apparatus determines that the battery pack is overdischarged may be lower than a voltage at which the battery pack determines that the battery pack is overdischarged. In this case, overdischarge detection is performed in the device body prior to the overdischarge detection in the battery pack. When threshold values for various controls of the battery pack are the same regardless of an electrical apparatus to which the battery pack has been connected, appropriate control may not be performed in cases other than the overdischarge detection. Further, when there is a remaining capacity display unit in the device body or the battery pack, a remaining capacity display of the battery pack becomes a display showing that there is a remaining capacity even though the device body has been stopped due to overdischarge detection. There is a problem in that an operation and a display are not consistent with each other.

The present invention has been made in view of such a situation, and an objective of the present invention is to provide a battery pack and an electrical apparatus capable of transmitting information from the battery pack to a device body at an appropriate timing. Another objective of the present invention is to provide a battery pack capable of appropriate control according to an electrical apparatus to which the battery pack has been connected, and an electrical apparatus capable of appropriately controlling the battery pack.

Solution to Problem

An aspect of the present invention is an electrical apparatus. This electrical apparatus is an electrical apparatus including a battery pack, and a device body connected to the battery pack, wherein when the device body transmits a predetermined signal to the battery pack, the battery pack transmits a signal indicating information of the battery pack to the device body.

The device body may include a motor, and a switch configured to switch between driving and stopping of the motor, and the device body may transmit a predetermined signal to the battery pack at a timing when the switch is turned OFF.

The predetermined signal may be a signal for specifying information, the device body requesting the information from the battery pack, and when the battery pack receives the predetermined signal, the battery pack may transmit a signal indicating information specified by the predetermined signal among information of the battery pack to the device body.

Another aspect of the present invention is an electrical apparatus. This electrical apparatus is an electrical apparatus including a battery pack, and a device body connected to the battery pack, wherein when the battery pack transmits a predetermined signal to the electrical apparatus, the electrical apparatus transmits a signal indicating information of the electrical apparatus to the battery pack.

The predetermined signal may be a signal for specifying information, the battery pack requesting the information from the device body, and when the device body receives the predetermined signal, the device body may transmit a signal indicating information specified by the predetermined signal among information of the device body to the battery pack.

Yet another aspect of the present invention is a battery pack connectable to an electrical apparatus, the battery pack including a plurality of first communication circuits; a first battery-side communication terminal selectively connected to any one of the plurality of first communication circuits; a first switching circuit provided between the plurality of first communication circuits and the first battery-side communication terminal; and a battery-side switching terminal connected to the first switching circuit, wherein the first switching circuit switches among the plurality of first communication circuits to be connected to the first battery-side communication terminal according to a signal input from the battery-side switching terminal.

One of the plurality of first communication circuits may be a circuit configured to output an analog voltage indicating information of the battery pack.

The battery pack may include a battery-side control unit; a plurality of second communication circuits; a second battery-side communication terminal selectively connected to any one of the plurality of second communication circuits; and a second switching circuit provided between the plurality of second communication circuits and the second battery-side communication terminal, wherein the second switching circuit switches among the plurality of second communication circuits to be connected to the second battery-side communication terminal according to a signal input from the battery-side control unit.

One of the plurality of first communication circuits may be a reception circuit configured to receive a signal from an electrical apparatus, and the battery-side control unit may determine a voltage to be input to the second switching circuit according to the signal received via the reception circuit.

One of the plurality of second communication circuits may be a circuit configured to output an analog voltage indicating information of the battery pack.

One of the plurality of second communication circuits may be a transmission circuit configured to transmit a signal to an electrical apparatus.

Yet another aspect of the present invention is an electrical apparatus. This electrical apparatus is an electrical apparatus including a battery pack and a device body connected to the battery pack, wherein the device body includes a body-side control unit; a first body-side communication terminal connected to the first battery-side communication terminal; and a body-side switching terminal connected to the battery-side switching terminal, and the body-side control unit inputs a signal to the first switching circuit via the body-side switching terminal and the battery-side switching terminal.

Yet another aspect of the present invention is an electrical apparatus to which a battery pack is connectable, the electrical apparatus including a plurality of communication circuits; a body-side communication terminal selectively connected to any one of the plurality of communication circuits; a switching circuit provided between the plurality of communication circuits and the body-side communication terminal; and a body-side switching terminal connected to the switching circuit, wherein the switching circuit switches among the plurality of communication circuits to be connected to the body-side communication terminal according to a signal input from the body-side switching terminal.

One of the plurality of communication circuits may be a circuit configured to receive a discharge permission/prohibition signal from the battery pack.

Yet another aspect of the present invention is a battery pack connectable to an electrical apparatus, wherein the battery pack switches between control threshold values according to a signal received from the electrical apparatus to which the battery pack has been connected.

The threshold value may be a threshold value for abnormality detection.

The threshold value may include at least one of an overdischarge threshold value, an overcurrent threshold value, and a high temperature protection threshold value of a battery cell.

The threshold value may be threshold value for switching between notifications of a remaining capacity of the battery pack.

Yet another aspect of the present invention is a battery pack connectable to an electrical apparatus, wherein when the battery pack receives an overdischarge detection signal from the electrical apparatus to which the battery pack has been connected, the battery pack notifies that a remaining capacity of the battery pack is low or zero.

Yet another aspect of the present invention is a battery pack connectable to an electrical apparatus, wherein the battery pack switches between notifications of the remaining capacity of the battery pack according to a signal from the electrical apparatus to which the battery pack has been connected.

Yet another aspect of the present invention is an electrical apparatus including a battery pack and a device body connected to the battery pack, wherein the device body transmits an abnormality detection signal when an abnormality has been detected to the battery pack.

When the battery pack receives the abnormality information, the battery pack notifies that there is an abnormality.

Yet another aspect of the present invention is an electrical apparatus including a battery pack and a device body connected to the battery pack, wherein the device body transmits abnormality information of the device body to the battery pack to cause the abnormality information to be displayed on the battery pack.

Yet another aspect of the present invention is an electrical apparatus including a battery pack and a device body connected to the battery pack, wherein when the device body has been stopped due to detection of an abnormality, the device body transmits a signal indicating that the device body has been stopped to the battery pack.

A reference value for an abnormality discrimination may be different between the device body and the battery pack.

Yet another aspect of the present invention is an electrical apparatus including a battery pack and a device body connected to the battery pack, wherein when an abnormality has been detected in one of the battery pack and the device body, the one notifies that the abnormality has been detected.

Yet another aspect of the present invention is an electrical apparatus including a battery pack and a device body connected to the battery pack, wherein when an abnormality has been detected in one of the battery pack and the device body, the other thereof notifies that the abnormality has been detected.

Yet another aspect of the present invention is an electrical apparatus including a battery pack and a device body connected to the battery pack, wherein the battery pack and the device body include a remaining capacity display unit configured to display a remaining capacity of the battery pack, display states of both the remaining capacity display units matching each other.

Any combination of the above components, and conversion of representation of the present invention between, for example, methods and systems are also effective as aspects of the present invention.

Advantageous Effects of Invention

According to the present invention, it is possible to provide a battery pack and an electrical apparatus capable of transmitting information from the battery pack to the device body at an appropriate timing. Further, according to the present invention, it is possible to provide a battery pack capable of appropriate control according to an electrical apparatus to which the battery pack has been connected, and an electrical apparatus capable of appropriately controlling the battery pack.

DESCRIPTION OF EMBODIMENTS

Hereinafter, preferred embodiments of the present invention will be described in detail with reference to the drawings. The same or equivalent components, members, processes, and the like illustrated in the respective drawings are denoted by the same reference signs, and repeated description thereof will be omitted. Further, the embodiments do not limit the invention but are illustrative, and all charac- teristics or combinations thereof described in the embodiments are not necessarily essential to the invention.

Figure 1:
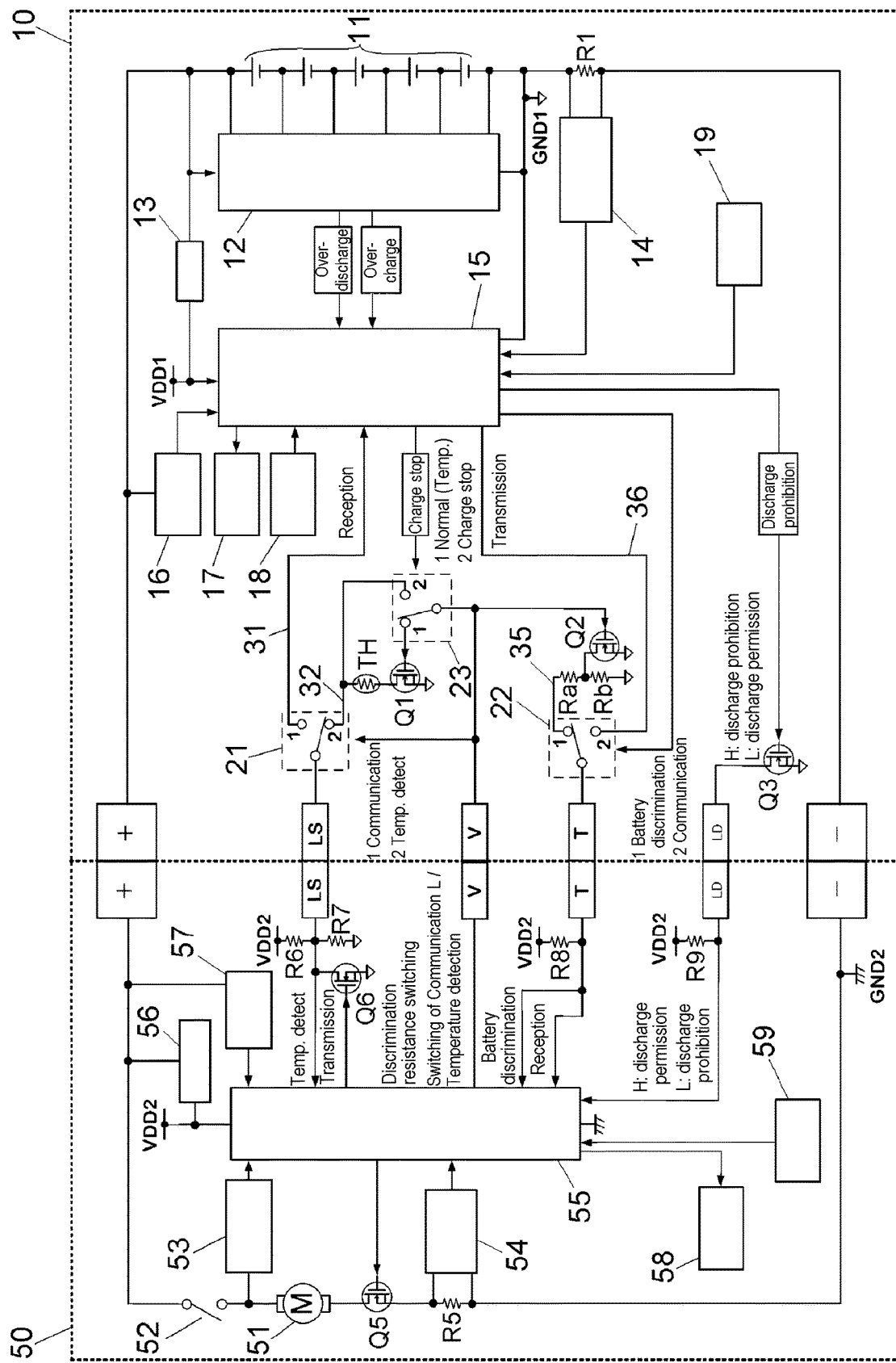
FIG. 1 is a block diagram of an embodiment of the present invention and is a block diagram in a state in which a battery pack 10 is connected to an electric tool 50.
Figure 2:
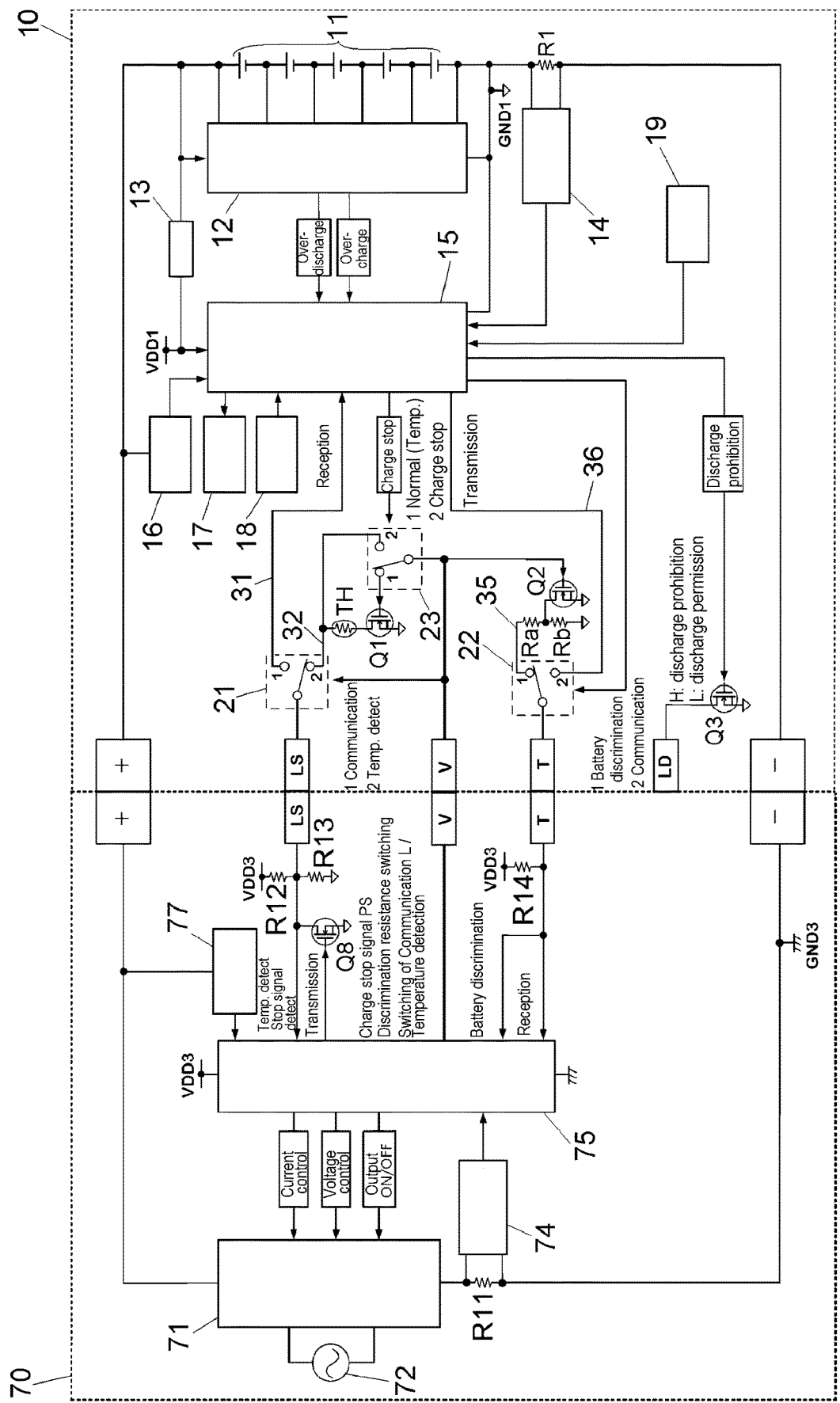
FIG. 2 is a block diagram of the embodiment of the present invention, and is a block diagram in a state in which the battery pack 10 is connected to a charger 70.

FIG. 1 is a block diagram of an embodiment of the present invention, and is a block diagram of a state in which a battery pack 10 is connected to an electric tool 50. FIG. 2 is a block diagram of the embodiment of the present invention, and is a block diagram of a state in which the battery pack 10 is connected to a charger 70. As illustrated in FIG. 1, each of the battery pack 10 and the electric tool 50 includes a positive terminal, an LS terminal, a V terminal, a T terminal, an LD terminal, and a negative terminal. Terminals having the same name in the battery pack 10 and the electric tool 50 are electrically connected to each other. As illustrated in FIG. 2, the charger 70 includes a positive terminal, an LS terminal, a V terminal, a T terminal, and a negative terminal. Terminals having the same name in the battery pack 10 and the charger 70 are electrically connected to each other. The LS terminal of the battery pack 10 is an example of a first battery-side communication terminal, and the LS terminals of the electric tool 50 and the charger 70 are examples of a first body-side communication terminal. The T terminal of the battery pack 10 is an example of a second battery-side communication terminal, and the T terminals of the electric tool 50 and the charger 70 are examples of a second body-side communication terminal. The V terminal of the battery pack 10 is an example of a battery-side switching terminal, and the V terminals of the electric tool 50 and the charger 70 are examples of a body-side switching terminal.

The battery pack 10 includes a plurality of (here, five) secondary battery cells 11 connected in series between the positive terminal and the negative terminal. A cell voltage monitoring IC 12 monitors a voltage of each secondary battery cell 11, determines that the battery pack 10 is overdischarged when a voltage of at least one secondary battery cell 11 falls below a predetermined value, determines that the battery pack 10 is overcharged when the voltage of the at least one secondary battery cell 11 exceeds a predetermined value for overcharge, and transmits an overdischarge detection signal or overcharge detection signal to a control unit (battery-side control unit) 15. A resistor R1 for current detection is connected in series with the secondary battery cell 11. A current detection circuit 14 detects an output current of the secondary battery cell 11 on the basis of a voltage across the resistor R1, and transmits a detection result to the control unit 15. A power supply circuit 13 generates a power supply voltage VDD1 for the cell voltage monitoring IC 12 and the control unit 15 from the output voltage of the secondary battery cell 11. A battery voltage detection circuit 16 detects the output voltage of the secondary battery cell 11 and transmits a detection result to the control unit 15. A remaining capacity display means 17 is, for example, an LED, and displays (notifies) a remaining capacity of the battery pack 10 to a user under the control of the control unit 15. A cell temperature detection means 18 detects a temperature of the secondary battery cell 11 on the basis of a voltage of a thermistor TH disposed near the secondary battery cell 11 and outputs a voltage value corresponding to the temperature to the control unit 15. A remaining capacity display switch 19 is a switch for allowing the user to instruct the remaining capacity display means 17 to display the remaining capacity.

The battery pack 10 includes a serial communication reception circuit 31 that forms a path for causing the control unit 15 to receive a serial communication signal (a digital signal) transmitted from the electric tool 50, and a temperature information transmission circuit 32 that forms a path for transmitting an analog voltage (temperature information of the secondary battery cell 11) at one terminal of the thermistor TH to the electric tool 50. The serial communication reception circuit 31 and the temperature information transmission circuit 32 are examples of a first communication circuit. The LS terminal of the battery pack 10 is selectively connected to either the serial communication reception circuit 31 or the temperature information transmission circuit 32 via a first switching circuit 21. The first switching circuit 21 includes a terminal connected to the LS terminal, a control terminal connected to the V terminal, and the other terminal selectively connected to either the serial communication reception circuit 31 or the temperature information transmission circuit 32 according to a signal input from the V terminal. Here, when the signal from the V terminal is at a low level, the other terminal of the first switching circuit 21 is connected to the serial communication reception circuit 31, and when the signal from the V terminal is at a high level, the other terminal of the first switching circuit 21 is connected to the temperature information transmission circuit 32. The one terminal of the thermistor TH is connected to the other terminal of the first switching circuit 21. A switching element Q1 such as an FET is provided between the other terminal of the thermistor TH and a ground. A third switching circuit 23 includes one terminal connected to the V terminal, a control terminal connected to the control unit 15, and the other terminal selectively connected to either a control terminal (a gate) of the switching element Q1 or the one terminal (the other terminal of the first switching circuit 21) of the thermistor TH according to a signal input from the control unit 15.

The battery pack 10 includes an identification information transmission circuit 35 that forms a path for transmitting an analog voltage (identification information of the battery pack 10) at one terminal of an identification resistor Ra to the electric tool 50, and a serial communication transmission circuit 36 that forms a path for transmitting a serial communication signal (a digital signal) directed from the control unit 15 to the electric tool 50. The identification information transmission circuit 35 and the serial communication transmission circuit 36 are examples of a second communication circuit. The T terminal of the battery pack 10 is selectively connected to either the identification information transmission circuit 35 or the serial communication transmission circuit 36 via a second switching circuit 22. The second switching circuit 22 includes one terminal connected to the T terminal, a control terminal connected to the control unit 15, and the other terminal selectively connected to either the identification information transmission circuit 35 or the serial communication transmission circuit 36 according to a signal input from the control unit 15. The one terminal of the identification resistor Ra is connected to the other terminal of the second switching circuit 22. An identification resistor Rb and a switching element Q2 such as an FET are connected in parallel between the other terminal of the identification resistor Ra and the ground. A control terminal (a gate) of the switching element Q2 is connected to the V terminal. When a signal input from the V terminal is at a high level, the switching element Q2 is turned ON, and no current flows through the identification resistor Rb. When the signal input from the V terminal is at a low level, the switching element Q2 is turned OFF, and a current flows through the identification resistor Rb.

In the battery pack 10, a switching element Q3 such as an FET is provided between the LD terminal and the ground. A control terminal (a gate) of the switching element Q3 is connected to the control unit 15. When a signal input from the control unit 15 to the control terminal is at a high level, the switching element Q3 is turned ON, and when the signal is at a low level, the switching element Q3 is turned OFF.

The electric tool 50, which is an example of an electrical apparatus, includes a motor 51 serving as a driving source, a trigger switch 52, a switching element Q5 such as an FET, and a resistor R5, which are connected in series between the positive terminal and the negative terminal. The motor 51 is a motor with a brush herein, but may be a brushless motor. A control terminal (a gate) of the switching element Q5 is connected to a control unit (body-side control unit) 55. A switch state detection circuit 53 detects on/off of the trigger switch 52 on the basis of a terminal voltage on the motor 51 side of the trigger switch 52 and transmits a detection result to the control unit 55. When the trigger switch 52 is turned ON, the control unit 55 turns ON the switching element Q5 continuously or intermittently so that a driving current is supplied to the motor 51. Being intermittently ON is, for example, PWM control. A current detection circuit 54 detects a current flowing through the motor 51 on the basis of a voltage across the resistor R5, and transmits a detection result to the control unit 55. A power supply circuit 56 generates a power supply voltage VDD2 of the control unit 55 from an input voltage from a positive terminal (the output voltage of the secondary battery cell 11). A battery voltage detection circuit 57 detects the output voltage of the secondary battery cell 11 on the basis of a voltage at the positive terminal, and transmits a detection result to the control unit 55. A remaining capacity display means 58 is, for example, an LED, and displays (notifies) a remaining capacity of the battery pack 10 to the user under the control of the control unit 55. The remaining capacity display switch 59 is a switch for allowing the user to instruct the remaining capacity display means 58 to display the remaining capacity.

In the electric tool 50, the control unit 55 includes terminals respectively connected to the LS terminal, the V terminal, the T terminal, and the LD terminal. One terminal of a resistor R6 is connected to a power supply line. A resistor R7 and a switching element Q6 such as an FET are connected in series between the other terminal of the resistor R6 and the ground. An interconnection point of the resistor R6 and the resistor R7 is connected to the LS terminal. A control terminal (a gate) of the switching element Q6 is connected to the control unit 55. A resistor R8 is provided between the power supply line and the T terminal. A resistor R9 is provided between the power supply line and the LD terminal.

The charger 70, which is an example of an electrical apparatus, includes a charging circuit 71 between the positive terminal and the negative terminal. The charging circuit 71 generates charging power for the secondary battery cell 11 from power supplied from an AC power source 72 under the control of the control unit (a body-side control unit) 75. A resistor R11 is connected in series to the charging circuit 71. A current detection circuit 74 detects an output current of the charging circuit 71 (a charging current directed to the secondary battery cell 11) on the basis of a voltage across the resistor R11, and transmits a detection result to a control unit 75. A battery voltage detection circuit 77 detects the output voltage of the secondary battery cell 11 on the basis of a voltage at the positive terminal, and transmits the detection result to the control unit 75.

In the charger 70, the control unit 75 includes terminals respectively connected to the LS terminal, the V terminal, and the T terminal. One terminal of a resistor R12 is connected to the power supply line. A resistor R13 and a switching element Q8 such as an FET are connected in series between the other terminal of the resistor R12 and the ground. An interconnection point of the resistor R12 and the resistor R13 is connected to the LS terminal. A control terminal (a gate) of the switching element Q8 is connected to the control unit 75. A resistor R14 is provided between the power supply line and the T terminal.

The control unit 55 of the electric tool 50 can switch between functions of the LS terminal on the basis of a signal transmitted to the battery pack 10 via the V terminal. Specifically, when the control unit 55 transmits a high-level signal from the V terminal, a connection destination of the other terminal of the first switching circuit 21 becomes the temperature information transmission circuit 32, and the control unit 55 can receive a voltage at the one terminal of the thermistor TH via the first switching circuit 21 and the LS terminal. Since the control unit 15 of the battery pack 10 normally sets a connection destination of the other terminal of the third switching circuit 23 to the control terminal of the switching element Q1, the switching element Q1 is turned ON when the signal at the V terminal is at a high level, such that an analog voltage according to the temperature of the secondary battery cell 11 is output to the one terminal (the temperature information transmission circuit 32) of the thermistor TH. Further, when the signal at the V terminal is at the high level, the switching element Q2 is turned ON, and the voltage at the T terminal becomes a first identification voltage obtained by dividing a power supply voltage VDD2 of the electric tool 50 using the resistor R8 and the resistor Ra.

On the other hand, when the control unit 55 transmits a low-level signal from the V terminal, the connection destination of the other terminal of the first switching circuit 21 becomes the serial communication reception circuit 31, and the serial communication signal can be transmitted to the control unit 15 of the battery pack 10 via the LS terminal. The serial communication signal is created by the switching element Q6 being ON and OFF. Further, when the signal at the V terminal is at a low level, the switching element Q2 is turned OFF, and the voltage at the T terminal becomes a second identification voltage obtained by dividing the power supply voltage VDD2 of the electric tool 50 using the resistor R8 and a series combined resistor of the resistor Ra and the resistor Rb. The control unit 55 can obtain information of the battery pack 10 on the basis of both the first and second identification voltages.

The control unit 75 of the charger 70 can switch between the functions of the LS terminal using a signal that is transmitted to the battery pack 10 via the V terminal, and can switch a voltage that is received from the T terminal to any one of the first and second identification voltages, similar to the control unit 55 of the electric tool 50.

The control unit 15 of the battery pack 10 can switch functions of the T terminal by switching a connection destination of the other terminal of the second switching circuit 22. Specifically, when the connection destination of the other terminal of the second switching circuit 22 is the serial communication transmission circuit 36, the control unit 15 can transmit the serial communication signal to the electric tool 50 or the charger 70 via the second switching circuit 22 and the T terminal. On the other hand, when the connection destination of the second switching circuit 22 is the identification information transmission circuit 35, the control unit 15 can output an analog voltage at the one terminal of the identification resistor Ra to the electric tool 50 or the charger 70 via the second switching circuit 22 and the T terminal.

Content of the serial communication signal that is transmitted from the electric tool 50 to the battery pack 10 include, for example, a type or model number of the electric tool 50, an overdischarge stop notification, an overdischarge display instruction, a threshold value for abnormality detection (for example, an overdischarge threshold value, an overcurent threshold value, or a high temperature protection threshold value of the secondary battery cell 11), a display threshold value for a a remaining capacity display (a threshold value for switching between remaining capacity displays), an error log, use history information, and information from the battery pack 10 to be requested. All of pieces of information may be transmitted from the electric tool 50 to the battery pack 10 or only information requested from the battery pack 10 may be transmitted. Content of the serial communication signal that is transmitted from the charger 70 to the battery pack 10 includes, for example, a type or model number of the charger 70, an error log, use history information, and information from the battery pack 10 to be requested. All of pieces of information may be transmitted from the charger 70 to the battery pack 10, or only information requested from the battery pack 10 may be transmitted. Content of the serial communication signal that is transmitted from the battery pack 10 to the electric tool 50 includes, for example, a type or model number of the battery pack 10, a type of the secondary battery cell 11, an error log, use history information, and information from the electric tool 50 to be requested. All pieces of information may be transmitted from the battery pack 10 to the electric tool 50, or only information requested from the electric tool 50 may be transmitted. Content of the serial communication signal that is transmitted from the battery pack 10 to the charger 70 include, for example, a type or model number of the battery pack 10, a type of the secondary battery cell 11, charging conditions, an error log, use history information, and information from the charger 70 to be requested. All of pieces of information may be transmitted from the battery pack 10 to the charger 70, or only information requested from the charger 70 may be transmitted. In the serial communication, it is possible to notify of the identification information of the battery pack 10 more or in greater detail than voltages of the identification resistors Ra and Rb. In the serial (digital) communication, a high signal or a low signal output from one control unit (a microcomputer) is input or output to or from the other control unit (a microcomputer), such that a signal on one side is output to the other side.

When the battery pack 10 is connected to the charger 70 and the charging stop condition is satisfied, the control unit 15 of the battery pack 10 sets the connection destination of the other terminal of the third switching circuit 23 to the one terminal of the thermistor TH (the other terminal of the first switching circuit 21). Since the control unit 75 of the charger 70 sets the signal at the V terminal to a high level during charging as will be described below, the connection destination of the other terminal of the first switching circuit 21 is the temperature information transmission circuit 32. Therefore, the signal (at a high level) at the V terminal is transmitted to the control unit 75 of the charger 70 via the third switching circuit 23, the first switching circuit 21, and the LS terminal, and the control unit 75 is notified that charging has been stopped.

When the control unit 15 of the battery pack 10 detects any one of overcurrent, overdischarge, and an abnormally high temperature of the secondary battery cell 11, the control unit 15 turns ON the switching element Q3. Accordingly, the voltage at the LD terminal decreases from the power supply voltage VDD2 of the electric tool 50 to the ground potential, and the control unit 55 is notified that discharge is prohibited.

Figure 3:
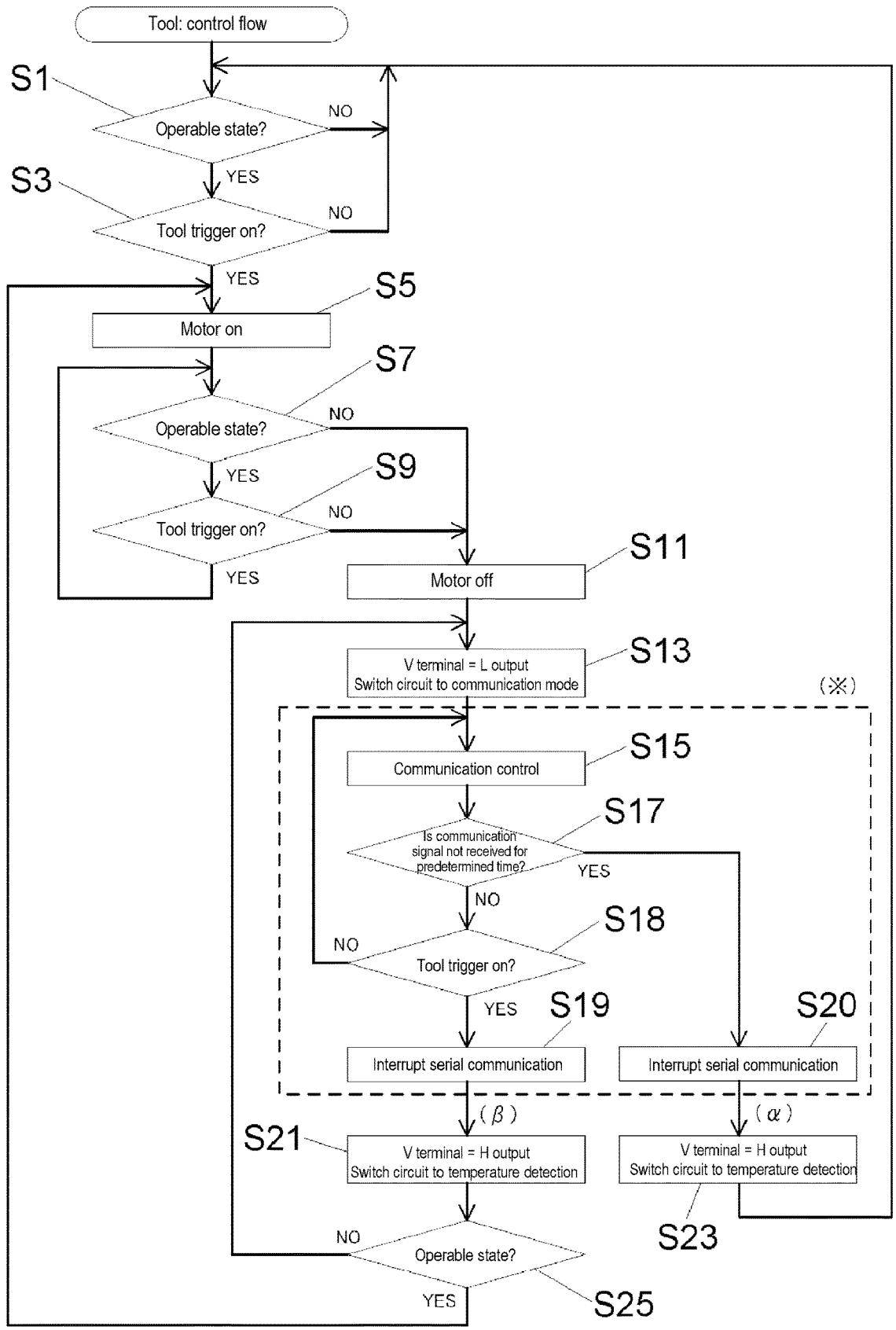
FIG. 3 is a control flowchart of the electric tool 50.

FIG. 3 is a control flowchart of the electric tool 50. When the electric tool 50 is in an operable state (YES in S1) and the trigger switch 52 is on (YES in S3), the control unit 55 turns ON the switching element Q5 continuously or intermittently so that the driving current is supplied to the motor 51 (S5). The operable state is a state in which all of a condition that a signal from the battery pack 10 indicates discharge permission (a signal from the LD terminal is at a high level), a condition that the battery pack 10 is not overdischarged, a condition that a current is not overcurrent, and a condition that the secondary battery cell 11 is not abnormally hot are satisfied.

When the electric tool 50 is no longer in the operable state (NO in S7) or the trigger switch 52 is turned OFF (NO in S9) while the motor 51 is being driven, the control unit 55 turns OFF the switching element Q5, stops the supply of the driving current to the motor 51, and stops the motor 51 (S11). The motor 51 being no longer in the operable state includes that the control unit 15 detects falling of a motor current (that the motor current no longer flow) in a state in which the switch state detection circuit 53 is detecting ON of the trigger switch 52, in addition to the fact that at least one of the conditions that the motor 51 enters the operable state is no longer satisfied. When the battery pack 10 is connected, the control unit 55 sets a signal to be output to the V terminal to a high level. However, after the motor 51 has been stopped in step S11, the control unit 55 switches the signal to be output to the V terminal to a low level (S13). Accordingly, the battery pack 10 is switched from a mode in which the temperature information is output to the LS terminal to a mode in which the serial communication signal is received via the LS terminal. The control unit 55 executes communication control (S15). When the communication signal is not received for a predetermined time during execution of the communication control (YES in S17), the control unit 55 interrupts the serial communication (S20), switches the signal to be output to the V terminal to a high level (S23), and returns to step S1. When the trigger switch 52 is turned ON (YES in S18) during execution of the communication control (NO in S17), the control unit 55 interrupts the serial communication (S19), switches the signal to be output to the V terminal to a high level (S21), returns to step S5 when the electric tool 50 is in the operable state (YES in S25), and returns to step S13 when the electric tool 50 is not in the operable state (NO in S25). When the signal to be output to the V terminal is switched to the high level in steps S21 and S23, the battery pack 10 is switched from the mode in which the serial communication signal is received via the LS terminal to the mode in which the temperature information is output to the LS terminal.

Figure 4:
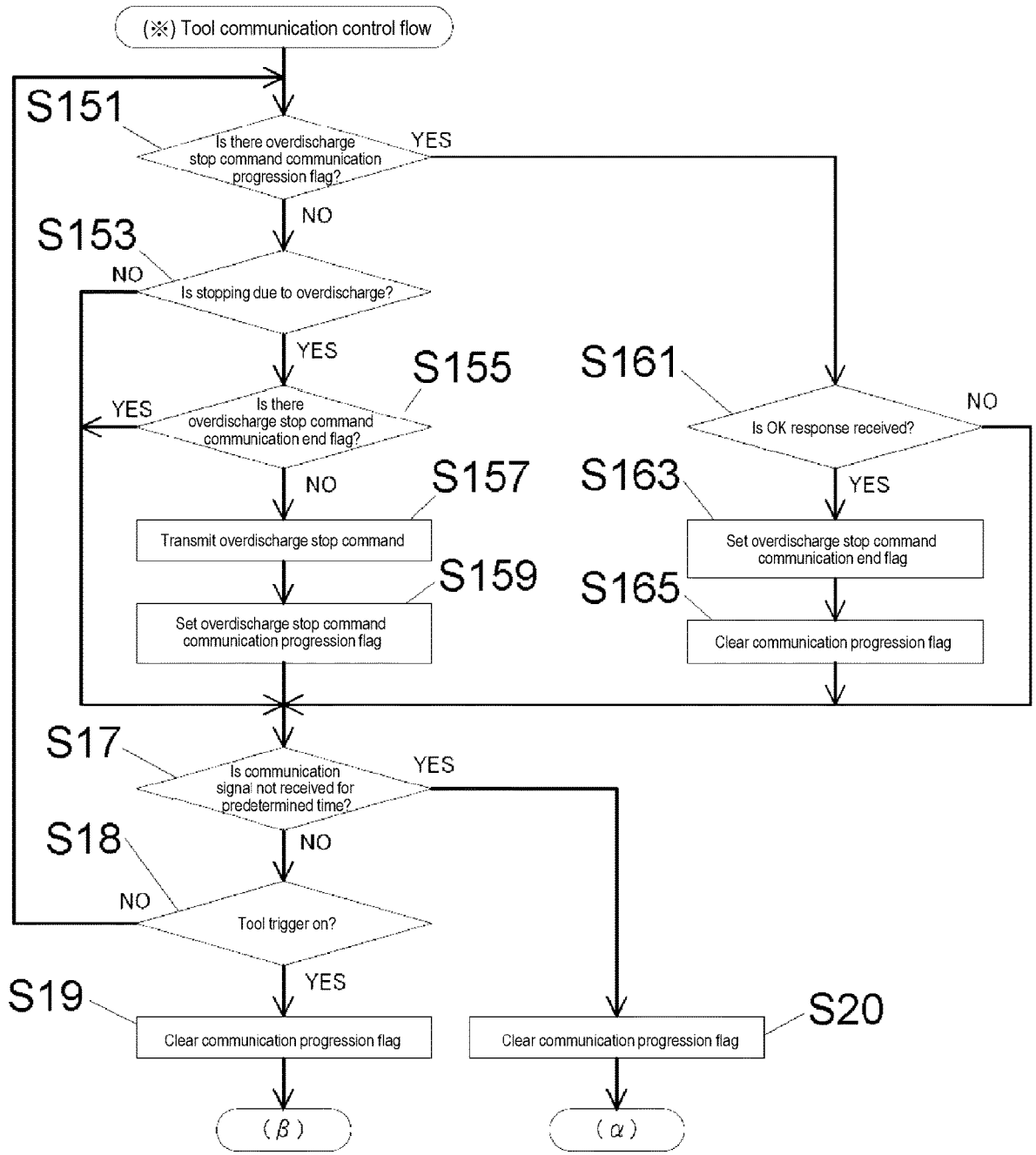
FIG. 4 is a flowchart illustrating a first example of communication control (S15) of the electric tool 50 illustrated in FIG. 3.

FIG. 4 is a flowchart illustrating a first example of the communication control (S15) of the electric tool 50 illustrated in FIG. 3. When an overdischarge stop command communication progression flag is not established (is not set) (NO in S151), the control unit 55 recognizes that a cause of stopping of the motor 51 is overdischarge (YES in S153). When an overdischarge stop command communication end flag is not established (NO in S155), the control unit 55 transmits an overdischarge stop command to the battery pack 10 via the LS terminal (S157), establishes (sets) the overdischarge stop command communication progression flag (S159), and waits for a signal from the battery pack 10 (S17). When the overdischarge stop command communication progression flag is set (YES in S151) and the control unit 55 receives an OK response to the overdischarge stop command from the battery pack 10 via the T terminal (YES in S161), the control unit 55 establishes the discharge stop command communication end flag (S163), and clears the overdischarge stop command communication progression flag (S165). When the cause of stopping of the motor 51 is not overdischarge (NO in S153), when the overdischarge stop command communication end flag is set (YES in S155), or when the control unit 55 does not receive the OK response to the overdischarge stop command from the battery pack 10 (NO in S161), the control unit 55 waits for a signal from the battery pack 10 (S17). When the control unit 55 does not receive the communication signal for a predetermined time (YES in S17), the control unit 55 clears the overdischarge stop command communication progression flag and interrupts the serial communication (S20). When the trigger switch 52 is turned ON (YES in S18), the control unit 55 clears the overdischarge stop command communication progression flag and interrupts the serial communication (S19). The control unit 55 may have a function of transmitting the overcurrent stop command to the battery pack 10 when the cause of stopping of the motor 51 is an overcurrent. In this case, the "overdischarge" in FIG. 4 and the above description regarding FIG. 4 can be replaced with an "overcurrent" for application. Further, for example, even when the serial communication is not possible, the control unit 15 of the battery pack 10 can discriminate that the electric tool 50 is no longer in the operable state. Specifically, in a case in which an abnormality signal (a signal from the LD terminal) is not input from the battery pack 10, the control unit 55 of the electric tool 50 or the control unit 15 of the battery pack 10 can determine that the electric tool 50 becomes abnormal (is no longer in the operable state) when a current is no longer detected in the resistor R5 or the resistor R1 by the current detection circuit 54 or the current detection circuit 14 even though the switch state detection circuit 53 detects ON of the trigger switch 52. Alternatively, a trigger switch state detection means (not illustrated) of the electric tool 50 is provided on the battery pack 10 side, and when the control unit 15 detects, through the current detection circuit 14, falling of a motor current flowing through the motor 51 (that the motor current no longer flows) in a state in which an ON state of the trigger switch 52 is continued, the battery pack 10 can discriminate that the electric tool 50 is no longer in the operable state. In this case, the remaining capacity display means 17 and 58 can be used to inform that the electric tool 50 is no longer in the operable state for some reasons. Further, the control unit 55 may have a function of transmitting a high temperature abnormality stop command to the battery pack 10 when a cause of stopping of the motor 51 is a high temperature abnormality of the secondary battery cell 11. In this case, the "overdischarge" in FIG. 4 and the above description regarding FIG. 4 is replaced with as an "high temperature abnormality" for application.

Figure 5:
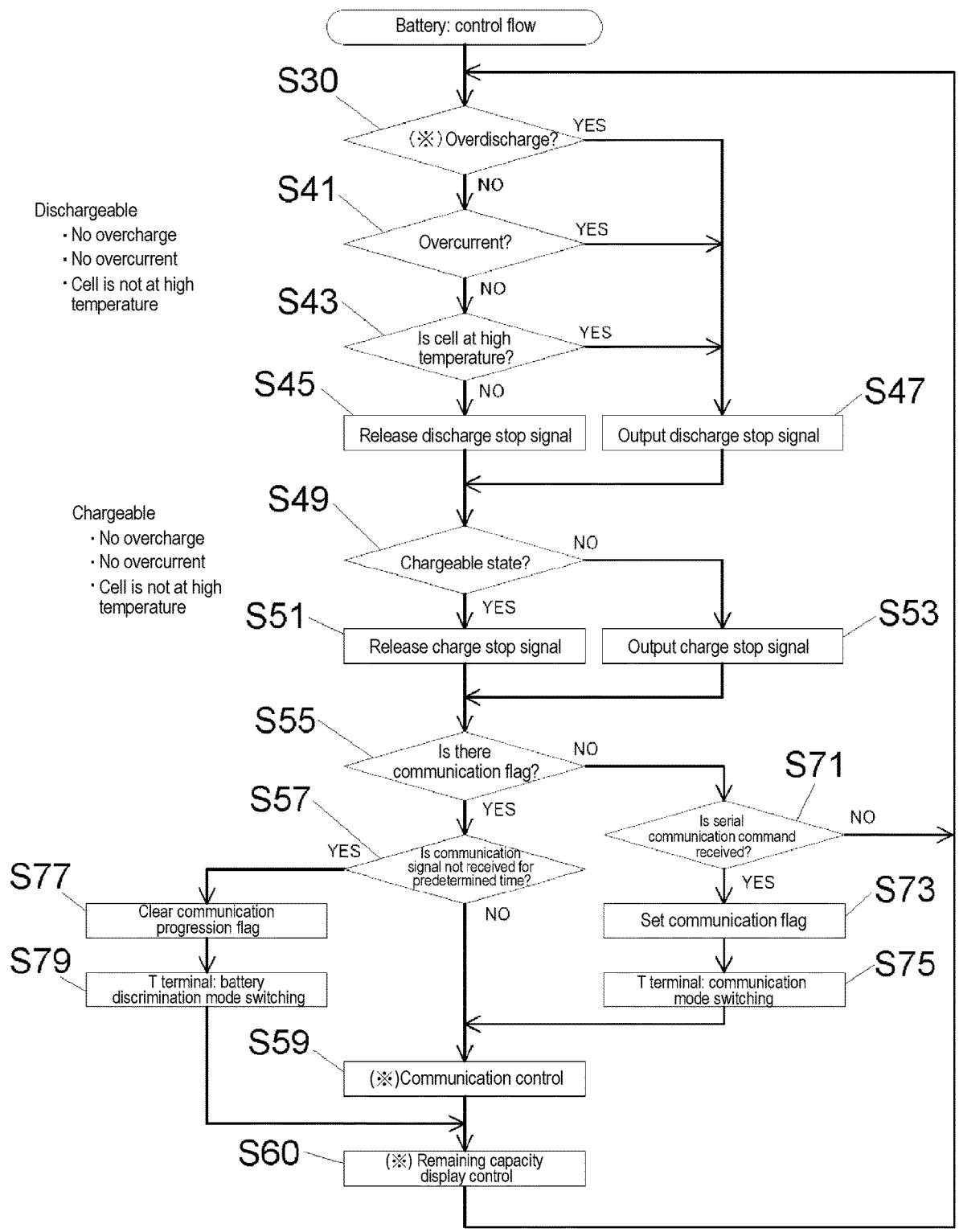
FIG. 5 is a control flowchart of the battery pack 10.

FIG. 5 is a control flowchart of the battery pack 10. When the battery pack 10 is not overdischarged (NO in S30), a current is not overcurrent (NO in S41), and the secondary battery cell 11 is not at an abnormally high temperature (NO in S43), the control unit 15 sets a signal applied to the control terminal of the switching element Q3 to a low level (releases a discharge stop signal) (S45). When the battery pack 10 is overdischarged (YES in S30), when the current is overcurrent (YES in S41), or when the secondary battery cell 11 is at an abnormally high temperature (YES in S43), the control unit 15 sets the signal applied to the control terminal of the switching element Q3 to a high level (outputs the discharge stop signal) (S47). The control unit 15 may determine that the current is an overcurrent in a case in which the control unit 15 receives the overcurrent stop command from the control unit 55 of the electric tool 50, in addition to the case in which the motor current exceeds a set overcurrent threshold value thereof, in the determination as to whether or not there is an overcurrent (S41). The control unit 15 may determine that the secondary battery cell 11 is at an abnormally high temperature in a case in which the control unit 15 receives the high temperature abnormal stop command from the control unit 55 of the electric tool 50, in addition to a case in which the temperature of the secondary battery cell 11 has exceeded the set high temperature protection threshold value thereof, in the determination (S43) as to whether the secondary battery cell 11 is at an abnormally high temperature.

When the secondary battery cell 11 is in a chargeable state (YES in S49), the control unit 15 sets the connection destination of the other terminal of the third switching circuit 23 to the control terminal of the switching element Q1 such that a charge stop signal is not output from the LS terminal (S51). The chargeable state is a state in which all of a condition that the battery pack 10 is not overcharged, a condition that a current is not an overcurrent, and a condition that the secondary battery cell 11 is not at an abnormally high temperature are satisfied. When the secondary battery cell 11 is not in the chargeable state (NO in S49), the control unit 15 sets the connection destination of the other terminal of the third switching circuit 23 to the one terminal of the thermistor TH (the other terminal of the first switching circuit 21) such that the charge stop signal is output from the LS terminal (S53).

When a communication flag is not established (NO in S55) and the control unit 15 receives the serial communication signal from the electric tool 50 or the charger 70 via the LS terminal (S71), the control unit 15 establishes the communication flag (S73), sets the connection destination of the other terminal of the second switching circuit 22 to the serial communication transmission circuit 36, switches a mode from a mode in which the identification information of the battery pack 10 is output to the T terminal to a mode in which the serial communication signal is transmitted via the T terminal (S75), and executes communication control (S59). When the communication flag is established (YES in S55) and a state in which no communication signal is received for a predetermined time does not continue (NO in S57), the control unit 15 executes communication control (S59). When the state in which the communication signal is not received for a predetermined time continues (YES in S57), the control unit 15 clears the communication flag (S77), sets the connection destination of the other terminal of the second switching circuit 22 to the identification information transmission circuit 35, and switches the mode from the mode in which the serial communication signal is transmitted via the T terminal to the mode in which the identification information of the battery pack 10 is output to the T terminal (S79). After the communication control (S59) or after the mode switching in step S79, the control unit 15 executes remaining capacity display control (S60).

Figure 6:
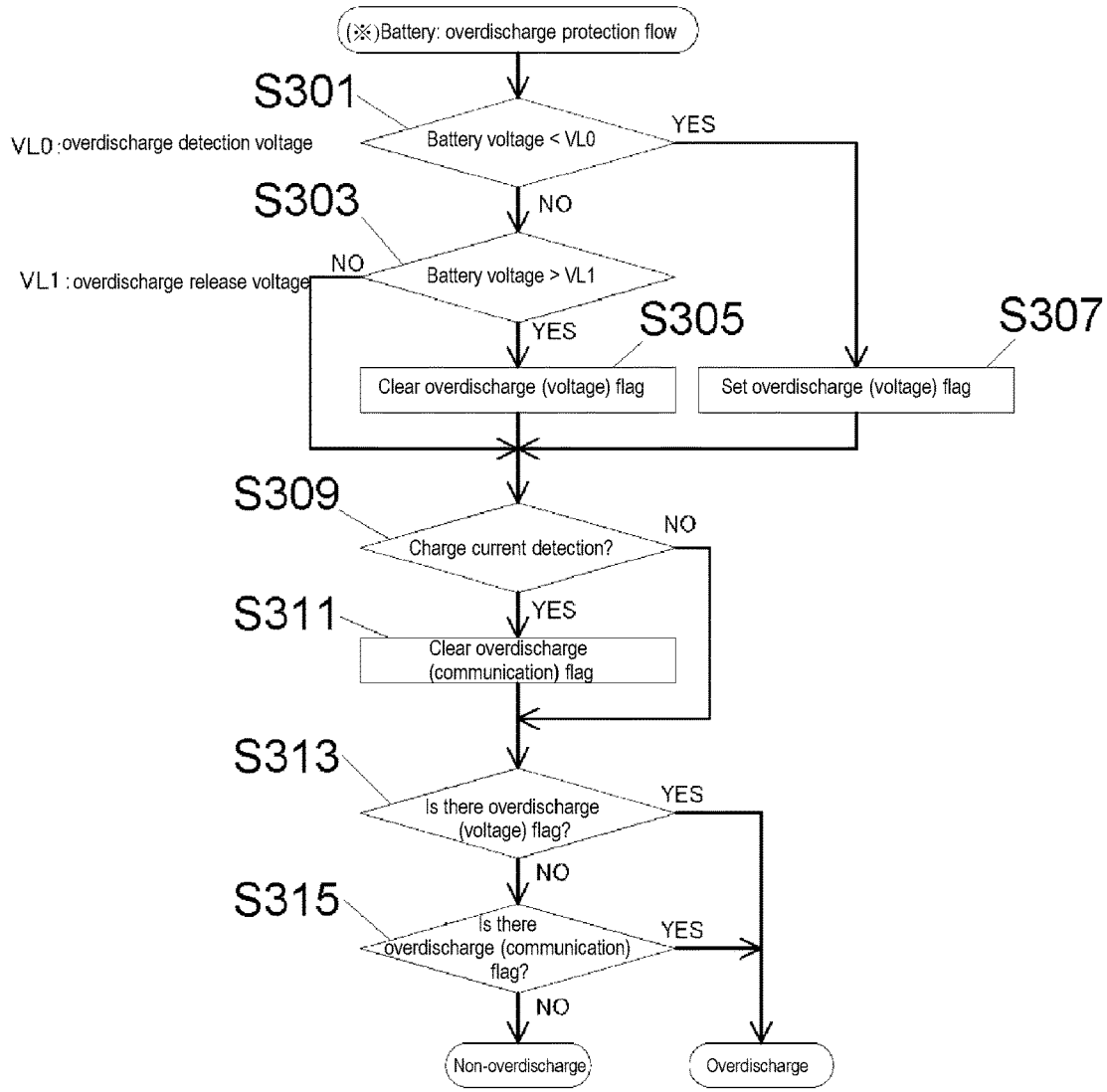
FIG. 6 is a flowchart illustrating a first example of an overdischarge determination (S30) of the battery pack 10 illustrated in FIG. 5.

FIG. 6 is a flowchart illustrating a first example of the overdischarge determination (S30) of the battery pack 10 illustrated in FIG. 5. When the voltage of the secondary battery cell 11 is not lower than an overdischarge detection voltage VL0 (NO in S301) and the voltage of the secondary battery cell 11 is higher than an overdischarge return voltage VL1 (YES in S303), the control unit 15 clears an overdischarge (voltage) flag (S305). When the voltage of the secondary battery cell 11 is smaller than the overdischarge detection voltage VL0 (YES in S301), the control unit 15 establishes the overdischarge (voltage) flag (S307). When the charging current is detected (YES in S309), the control unit 15 clears an overdischarge (communication) flag (S311). When the overdischarge (voltage) flag is established (YES in S313) or when the overdischarge (communication) flag is established (YES in S315), the control unit 15 determines that the battery pack 10 is overdischarged. When the overdischarge (voltage) flag is not established (NO in S313) and the overdischarge (communication) flag is not established (NO in S315), the control unit 15 determines that the battery pack 10 is not overdischarged.

Figure 7:
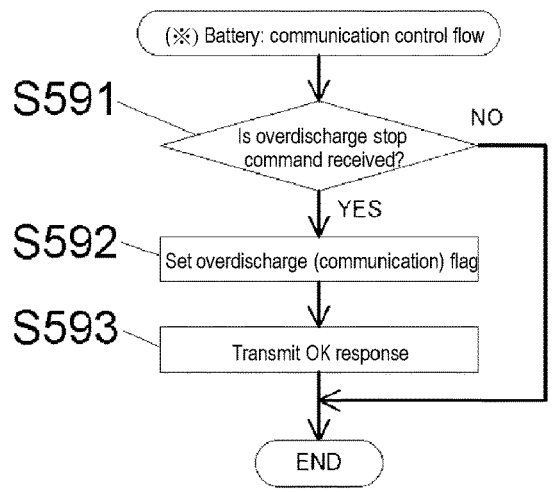
FIG. 7 is a flowchart illustrating a first example of communication control (S59) of the battery pack 10 illustrated in FIG. 5.

FIG. 7 is a flowchart illustrating a first example of the communication control (S59) of the battery pack 10 illustrated in FIG. 5. When the control unit 15 receives the overdischarge stop command from the electric tool 50 via the LS terminal (YES in S591), the control unit 15 establishes the overdischarge (communication) flag (S592) and transmits an OK response via the T terminal (S593).

Figure 8:
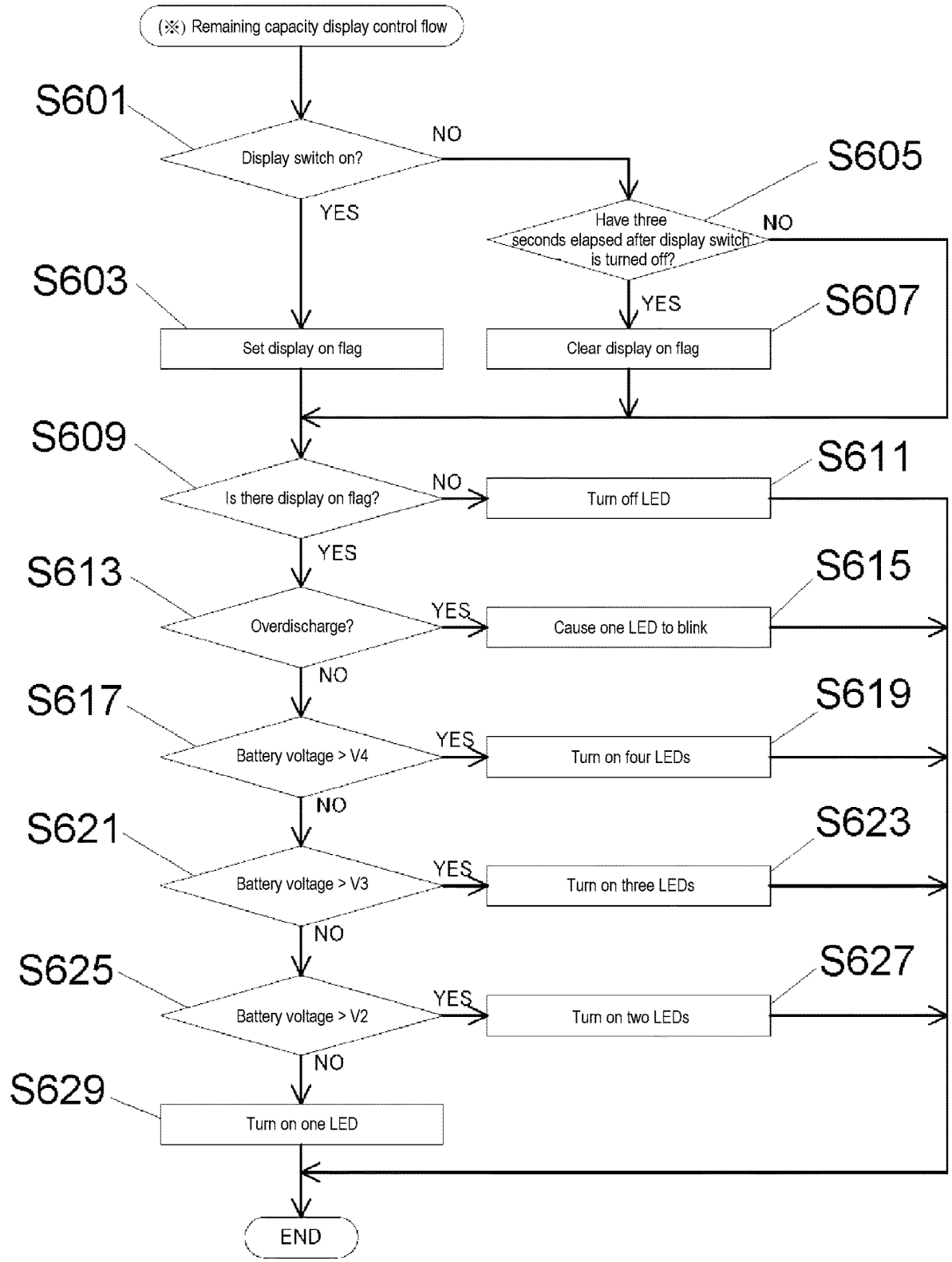
FIG. 8 is a flowchart of remaining capacity display control (S60) of the battery pack 10 illustrated in FIG. 5.

FIG. 8 is a flowchart of the remaining capacity display control (S60) of the battery pack 10 illustrated in FIG. 5. A case in which the remaining capacity display means 17 includes four LEDs will be described. When the remaining capacity display switch 19 is on (YES in S601), the control unit 15 establishes a display ON flag (S603). When the remaining capacity display switch 19 is not turned ON (NO in S601) and when three seconds or more have elapsed after the remaining capacity display switch 19 is turned OFF (YES in S605), the control unit 15 clears the display ON flag (S607). When the display ON flag is not established (NO in S609), the control unit 15 turns OFF the LEDs of the remaining capacity display means 17 (S611). When the display ON flag is established (YES in S609) and the battery pack 10 is overdischarged (YES in S613), the control unit 15 causes one of the LEDs of the remaining capacity display means 17 to blink (S615). When the battery pack 10 is not overdischarged (NO in S613) and the voltage of the secondary battery cell 11 is higher than V4 (YES in S617), the control unit 15 turns ON the four LEDs of the remaining capacity display means 17 (S619). When the voltage of the secondary battery cell 11 is equal to or lower than a first display threshold value V4 (NO in S617) and higher than a second display threshold value V3 (YES in S621), the control unit 15 turns on the three LEDS of the LEDs of the remaining capacity display means 17 (S623). When the voltage of the secondary battery cell 11 is equal to or lower than the second display threshold value V3 (NO in S621) and higher than the third display threshold value V2 (YES in S625), the control unit 15 turns on the two LEDS of the LEDs of the remaining capacity display means 17 (S627). When the voltage of the secondary battery cell 11 is equal to or lower than the third display threshold value V2 (NO in S625), the control unit 15 turns on one of the LEDs of the remaining capacity display means 17 (S629). Although not illustrated, when the control unit 15 determines that the current is an overcurrent (YES in S41 in FIG. 5), the control unit 15 may cause the LEDs of the remaining capacity display means 17 to blink in an aspect different from those at the time overdischarge (S615) regardless of the operation of the remaining capacity display switch 19 or may cause the number of LEDs different from those at the time overdischarge (S615) to blink. Further, when the control unit 15 determines that the secondary battery cell 11 is at an abnormally high temperature (YES in S43 in FIG. 5), the control unit 15 may cause the LEDs of the remaining capacity display means 17 to blink in aspects different from those at the time overdischarge (S615) and at the time of overcurrent regardless of the operation of the remaining capacity display switch 19 or may cause the number of LEDs different from those at the time overdischarge (S615) and at the time of overcurrent to blink.

Figure 9:
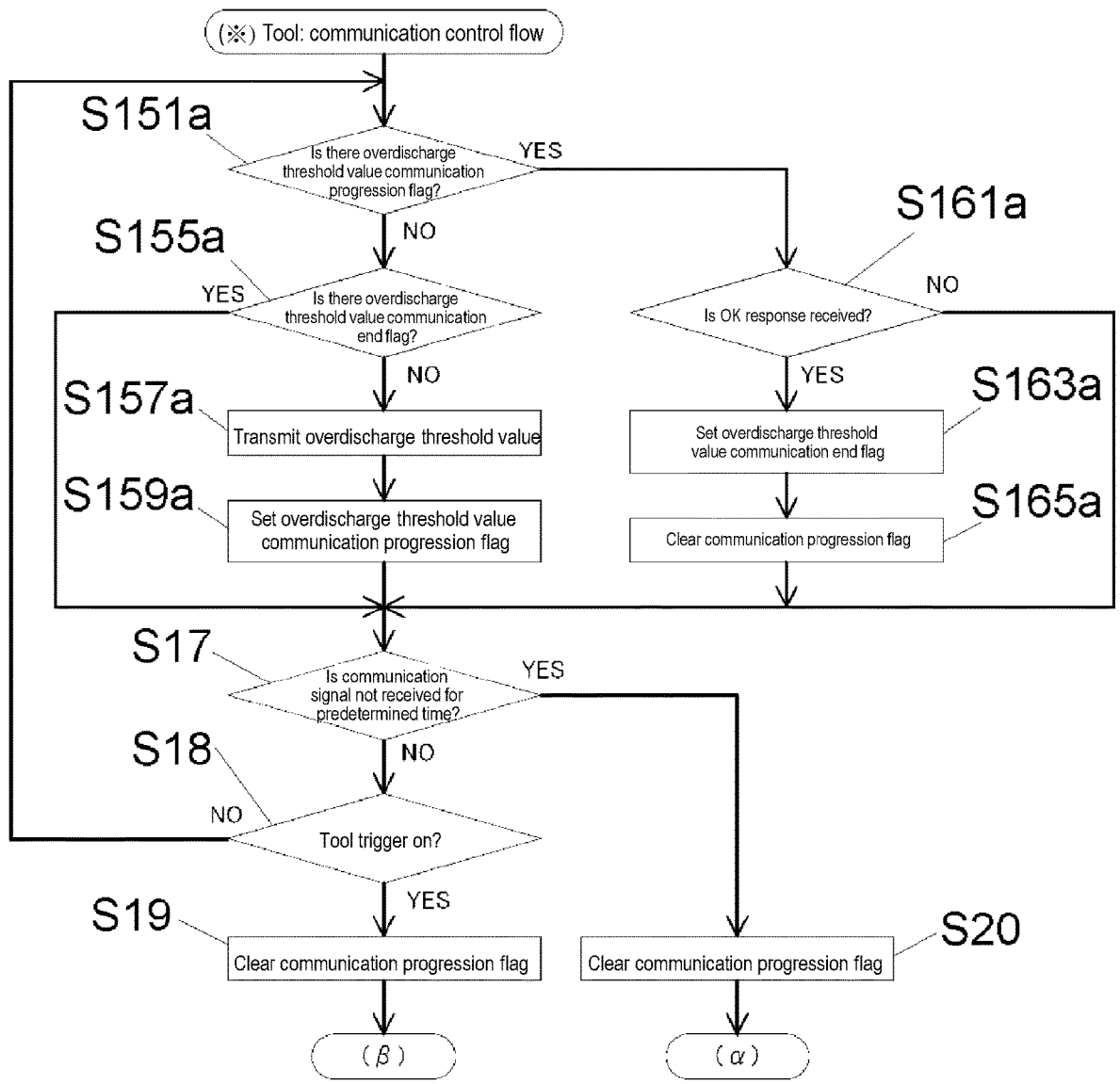
FIG. 9 is a flowchart illustrating a second example of the communication control (S15) of the electric tool 50 illustrated in FIG. 3.

FIG. 9 is a flowchart illustrating a second example of the communication control (S15) of the electric tool 50 illustrated in FIG. 3. When a overdischarge threshold value communication progression flag is not established (not set) (NO in S151a) and an overdischarge threshold value communication end flag is not established (NO in S155a), the control unit 55 transmits an overdischarge threshold value to the battery pack 10 via the LS terminal (S157a), establishes (sets) the overdischarge threshold value communication progression flag (S159a), and waits for a signal from the battery pack 10 (S17). When the overdischarge threshold value communication progression flag is established (YES in S151a) and the control unit 55 receives an OK response to the overdischarge threshold value from the battery pack 10 via the T terminal (YES in S161a), the control unit 55 establishes the overdischarge threshold value communication end flag (S163a), clears the overdischarge threshold value communication progression flag (S165a), and waits for a signal from the battery pack 10 (S17). When the overdischarge threshold value communication end flag is set (YES in S155a) or when an OK response to the overdischarge threshold value is not received from the battery pack 10 (NO in S161a), the control unit 55 waits for a signal from the battery pack 10 (S17). When the control unit 55 does not receive the communication signal for a predetermined time (YES in S17), the control unit 55 clears the overdischarge threshold value communication progression flag and interrupts the serial communication (S20). When the trigger switch 52 is turned ON (YES in S18), the control unit 55 clears the overdischarge threshold value communication progression flag and interrupts the serial communication (S19). The control unit 55 may transmit an overcurrent threshold value to the battery pack 10. In this case, the "overdischarge" in FIG. 9 and the above description regarding FIG. 9 is replaced with as an "overcurrent" for application. In the determination as to whether or not a current is an overcurrent (S41 in FIG. 5), the control unit 15 of the battery pack 10 may determine that there is an overcurrent in a case in which the motor current has exceeded the overcurrent threshold value received from the control unit 55 of the electric tool 50, in addition to the case in which the motor current exceeds a set overcurrent threshold value thereof. The control unit 55 may transmit the high temperature protection threshold value to the battery pack 10. In this case, the "overdischarge" in FIG. 9 and the above description regarding FIG. 9 is replaced with as "high temperature protection" for application. In the determination as to whether or not the secondary battery cell 11 is at an abnormally high temperature (S43 in FIG. 5), the control unit 15 of the battery pack 10 may determine that the secondary battery cell 11 is at an abnormally high temperature in a case in which the temperature of the secondary battery cell 11 has exceeded the high temperature protection threshold value received from the control unit 55 of the electric tool 50, in addition to a case in which the temperature of the secondary battery cell 11 has exceeded the set high temperature protection threshold value thereof. For example, in the case of a high-output tool, it is possible to suitably cope with a time lag of a voltage of the thermistor TH by setting a high temperature protection threshold value in the electric tool 50 to be lower than that of the battery pack 10.

Figure 10:
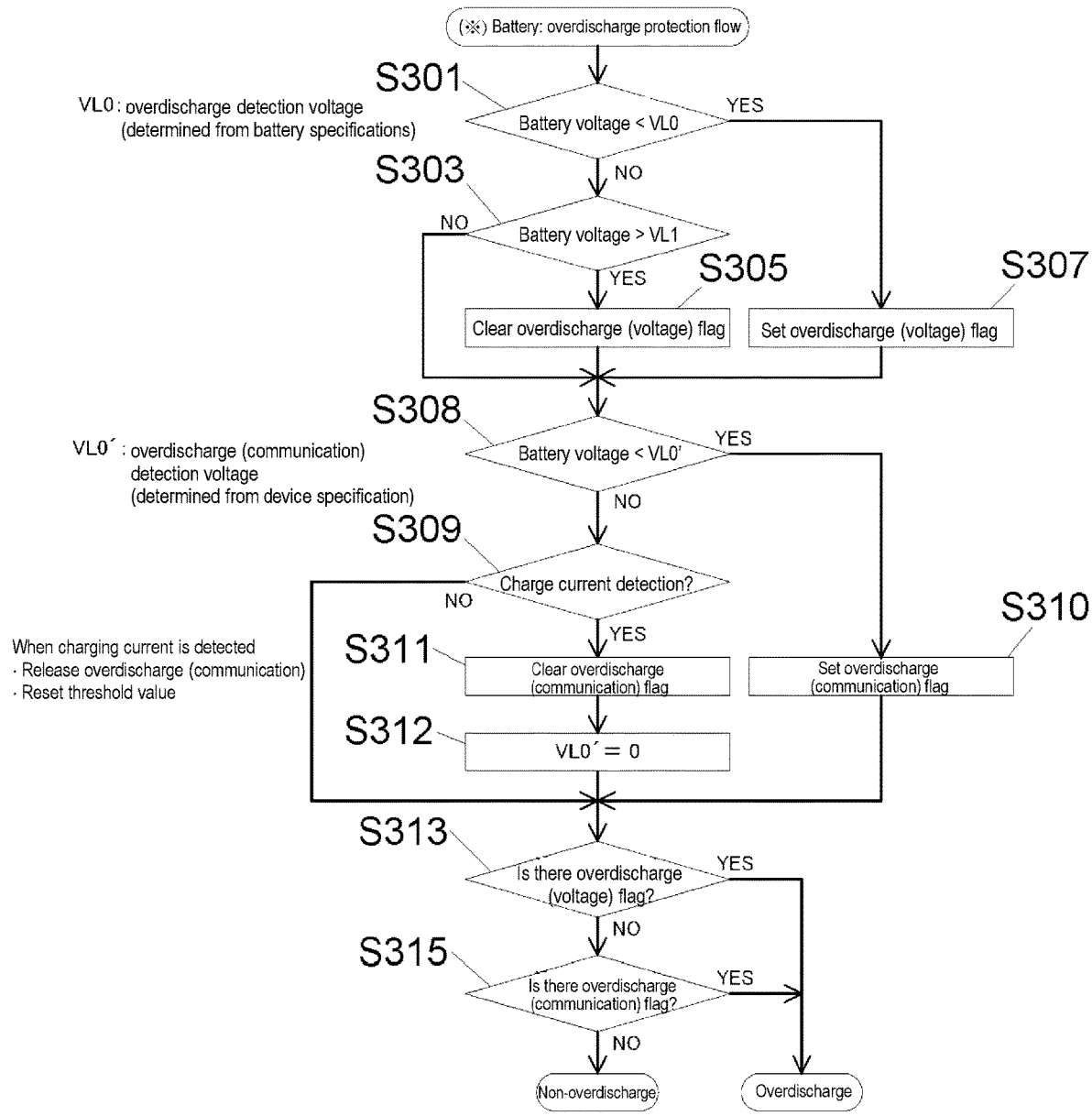
FIG. 10 is a flowchart illustrating a second example of the overdischarge determination (S30) of the battery pack 10 illustrated in FIG. 5.

FIG. 10 is a flowchart illustrating a second example of the overdischarge determination (S30) of the battery pack 10 illustrated in FIG. 5. This flowchart is different from that in the first example illustrated in FIG. 6 in that a process of establishing the overdischarge (communication) flag (S310) when the voltage of the secondary battery cell 11 is lower than an overdischarge detection voltage VL0' (YES in S308) is added, and a process of putting 0 into the overdischarge detection voltage VL0' (S312) when the charging current has been detected (YES in S309) is added, and is the same as that in the first example illustrated in FIG. 6 in other points. The overdischarge detection voltages VL0 and VL0' are both threshold values for determining whether or not the battery pack 10 is overdischarged. However, VL0 is a threshold value that is held by the battery pack 10 itself in advance, whereas VL0' is a threshold value transmitted from the electric tool 50.

Figure 11:
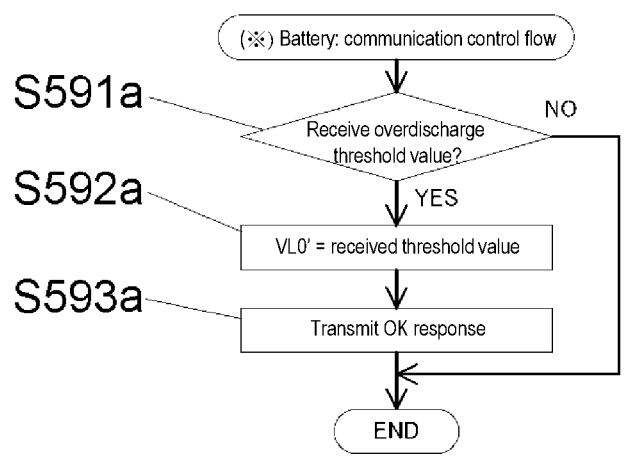
FIG. 11 is a flowchart illustrating a second example of the communication control (S59) of the battery pack 10 illustrated in FIG. 5.

FIG. 11 is a flowchart illustrating a second example of the communication control (S59) of the battery pack 10 illustrated in FIG. 5. When the control unit 15 receives the overdischarge threshold value from the electric tool 50 via the LS terminal (YES in S591a), the control unit 15 puts the received overdischarge threshold value into VL0' (S592a) and transmits an OK response via the T terminal. (S593a).

Figure 12:
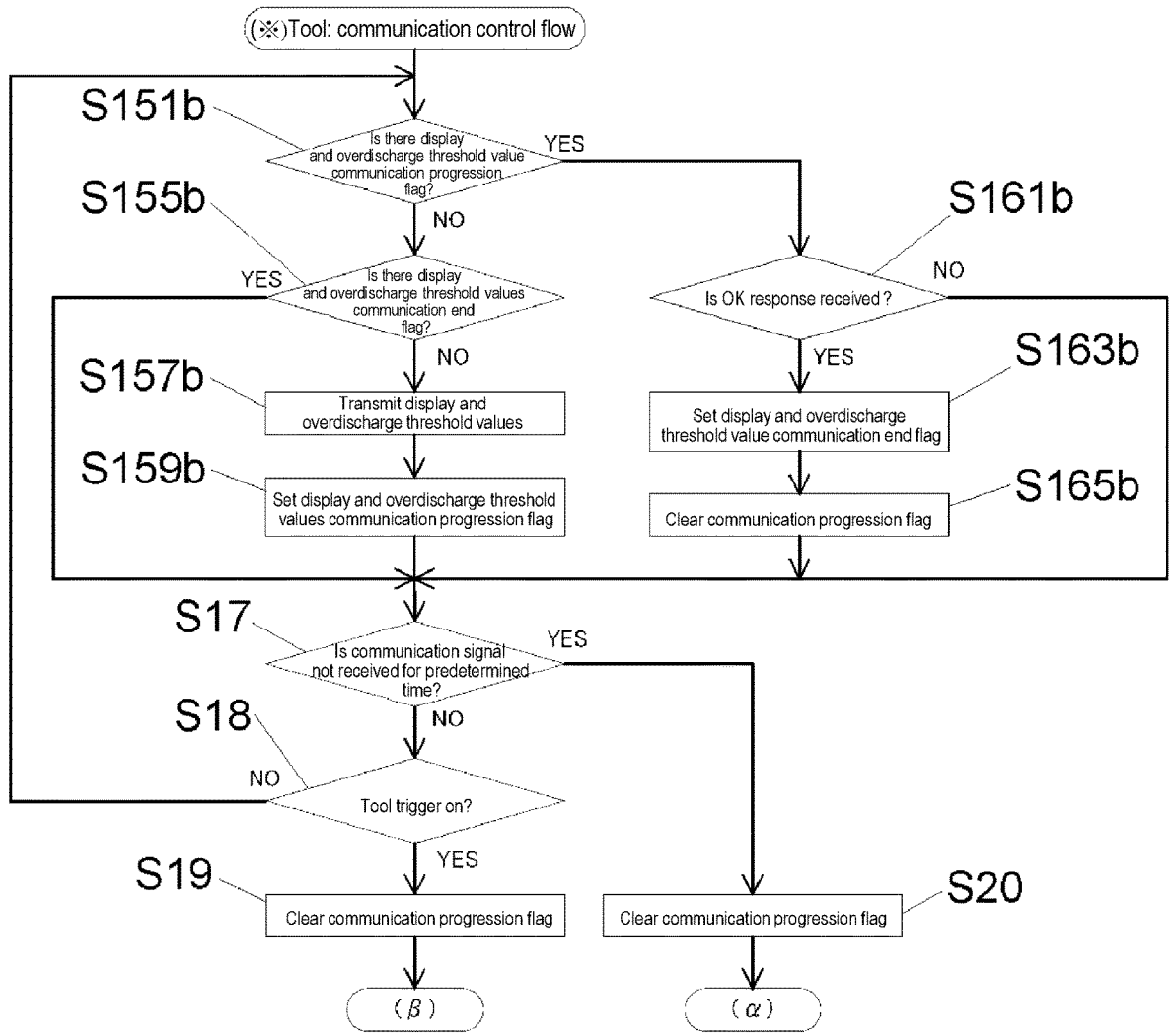
FIG. 12 is a flowchart illustrating a third example of the communication control (S15) of the electric tool 50 illustrated in FIG. 3.

FIG. 12 is a flowchart illustrating a third example of the communication control (S15) of the electric tool 50 illustrated in FIG. 3. This flowchart is different from that of the second example illustrated in FIG. 9 in that a display threshold value for switching a remaining capacity display in addition to the overdischarge threshold value is also transmitted from the electric tool 50 to the battery pack 10, and is the same as from that of the second example illustrated in FIG. 9 in other respects. In a case in which the display and overdischarge threshold value communication progression flag is not established (not set) (NO in S151b) and when the display and overdischarge threshold value communication end flag is not established (NO in S155b), the control unit 55 transmits the display and overdischarge threshold values to the battery pack 10 via the LS terminal (S157b), establishes (sets) the display and overdischarge threshold value communication progression flag (S159b), and waits for a signal from the battery pack 10 (S17). In a case in which the display and overdischarge threshold value communication progression flag is established (YES in S151b) and when the control unit 55 receives an OK response to the display and overdischarge threshold values from the battery pack 10 via the T terminal (YES in S161b), the control unit 55 establishes the display and overdischarge threshold value communication end flag (S163b), clears the display and overdischarge threshold value communication progression flag (S165b), and waits for a signal from the battery pack 10 (S17). When the display and overdischarge threshold value communication end flag is established (YES in S155b) or when the control unit 55 does not receive the OK response to the display and overdischarge threshold values from the battery pack 10 (NO in S161b), the control unit 55 waits for a signal from the battery pack 10 (S17). When the control unit 55 does not receive a communication signal for a predetermined time (YES in S17), the control unit 55 clears the display and overdischarge threshold value communication progression flag and interrupts the serial communication (S20). When the trigger switch 52 is turned ON (YES in S18), the control unit 55 clears the display and overdischarge threshold value communication progression flag and interrupts serial communication (S19).

Figure 13:
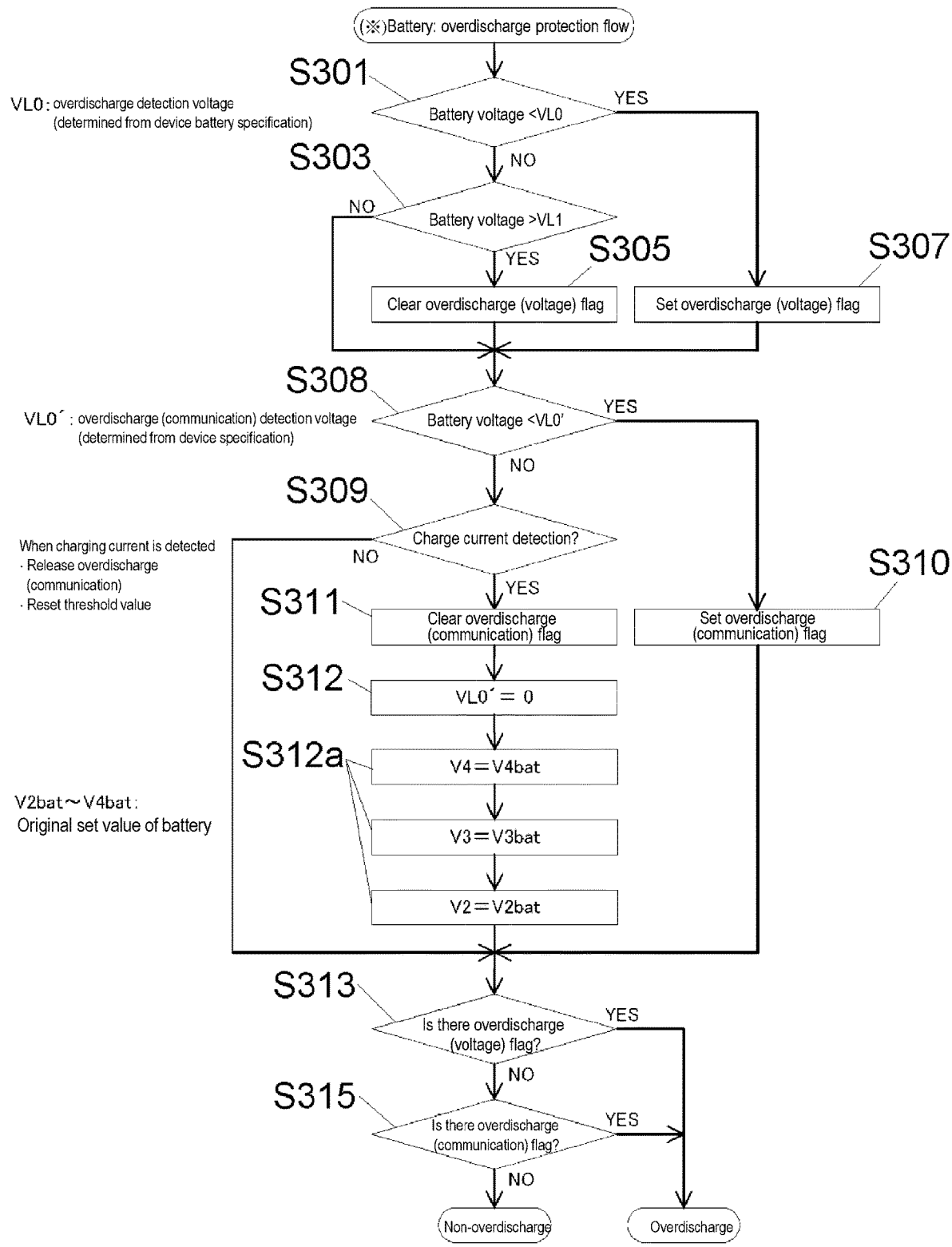
FIG. 13 is a flowchart illustrating a third example of the overdischarge determination (S30) of the battery pack 10 illustrated in FIG. 5.

FIG. 13 is a flowchart illustrating a third example of the overdischarge determination (S30) of the battery pack 10 illustrated in FIG. 5. This flowchart is different from the second example illustrated in FIG. 10 in that a process of detecting a charging current (YES in S309), putting 0 into the overdischarge detection voltage VL0' (S312), and putting respective initial values V4bat, V3bat, and V2bat into the first display threshold value V4, the second display threshold value V3, and the third display threshold value V2 (S312a) is added, and is the same as in the second example in other respects.

Figure 14:
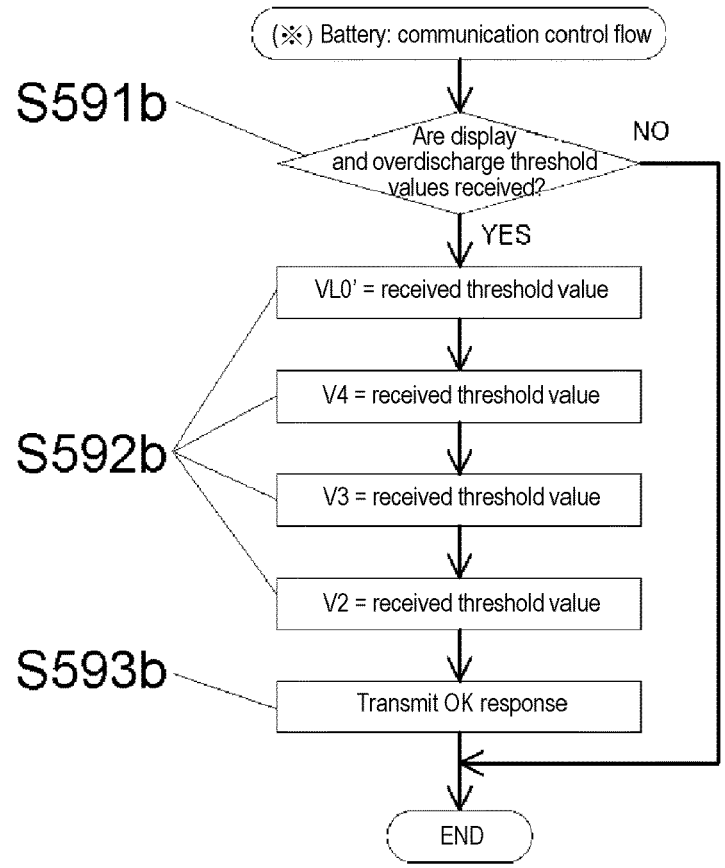
FIG. 14 is a flowchart illustrating a third example of communication control (S59) of the battery pack 10 illustrated in FIG. 5.

FIG. 14 is a flowchart illustrating a third example of the communication control (S59) of the battery pack 10 illustrated in FIG. 5. When the control unit 15 receives the display and overdischarge threshold values from the electric tool 50 via the LS terminal (YES in S591b), the control unit 15 puts the received overdischarge threshold value into VL0' (S592b), puts the received display threshold value into V4, V3, and V2 (S592b), and transmits an OK response via the T terminal (S593b).

Figure 15:
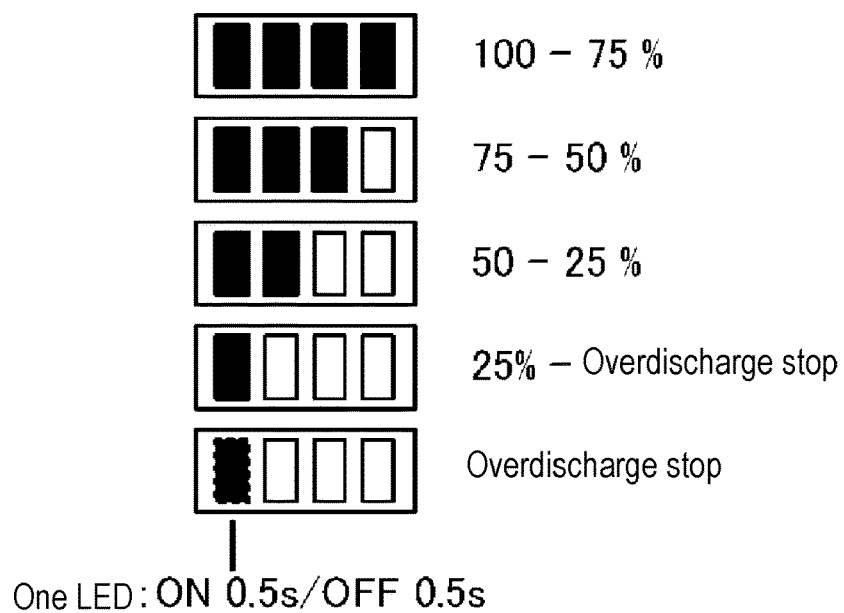
FIG. 15 is an illustrative diagram illustrating an example of a display of a remaining capacity display means 17 of the battery pack 10.

FIG. 15 is an illustrative diagram illustrating a display example of the remaining capacity display means 17 of the battery pack 10. Five display examples illustrated in FIG. 15 are arranged from the top in descending order of remaining capacity. ON of four LEDs at the top corresponds to a case in which the voltage of the secondary battery cell 11 is higher than V4, and the remaining capacity is 100 to 75%. ON of three LEDs that is second one from the top corresponds to a case in which the voltage of the secondary battery cell 11 is equal to or lower than the first display threshold value V4 and higher than the second display threshold value V3, and the remaining capacity is 75 to 50%. ON of two LEDs that is third one from the top corresponds to a case in which the voltage of the secondary battery cell 11 is equal to or lower than the second display threshold value V3 and higher than the third display threshold value V2, and the remaining capacity is 50 to 25%. ON of one LED that is fourth one from the top corresponds to a case in which the voltage of the secondary battery cell 11 is equal to or lower than the third display threshold value V2 but the battery pack 10 is not overdischarged, and the remaining capacity is 25% or less. Blinking of one LED that is fifth one from the top (both ON and OFF are, for example, at intervals of 0.5 seconds) corresponds to a case of overdischarge, and this is in a state in which discharge has been prohibited.

Figure 16:
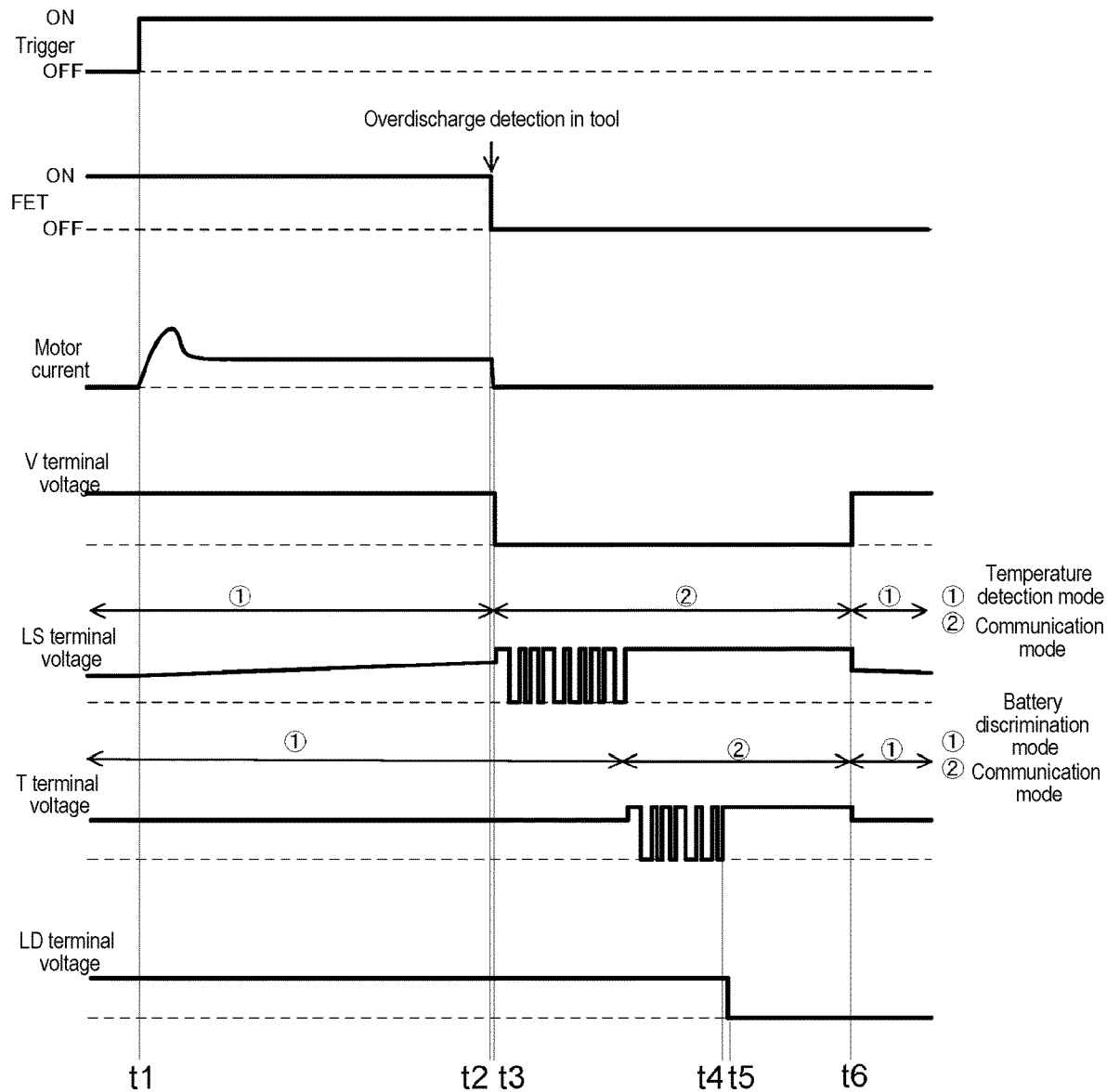
FIG. 16 is a time chart illustrating an example of an operation in the block diagram illustrated in FIG. 2.

FIG. 16 is a time chart illustrating an example of an operation in the block diagram illustrated in FIG. 1. When the trigger switch 52 is turned ON at time t1, a current begins to flow through the motor 51. Further, since the signal at the V terminal is at a high level, the LS terminal of the battery pack 10 is in a temperature detection mode, an analog voltage indicating the temperature information of the secondary battery cell 11 is output from the LS terminal, and the analog voltage start to increase at the same time as the current starts to flow through the motor 51. Further, the T terminal of the battery pack 10 is in a battery discrimination mode, and an analog voltage indicating the identification information of the battery pack 10 is output from the T terminal. When the control unit 55 of the electric tool 50 detects overdischarge at time t2, the control unit 55 turns OFF the switching element Q5 connected in series with the motor 51 to interrupt the current flowing through the motor 51. At time t3 when the motor 51 has been stopped, the control unit 55 switches the signal at the V terminal to a low level. Accordingly, the LS terminal is switched to a communication mode. The control unit 55 transmits a serial communication signal to the control unit 15 of the battery pack 10 via the LS terminal. This serial communication signal includes the overdischarge stop command indicating that the electric tool 50 has detected overdischarge and stopped the motor 51. In response thereto, the control unit 15 switches the T terminal to the communication mode and transmits the serial communication signal to the control unit 55 of the electric tool 50 via the T terminal. Thereafter, at time t5, the control unit 15 of the battery pack 10 switches the signal at the LD terminal from the high level to the low level by setting a voltage at the control terminal of the switching element Q3 connected to the LD terminal to a high level. This is because it has been notified that there is overdischarge using the serial communication signal from the control unit 55 of the electric tool 50. At time t6 when a predetermined time has elapsed from time t4 when the transmission of the serial communication signal has ended, the control unit 55 of the electric tool 50 switches the signal at the V terminal to the high level, the LS terminal of the battery pack 10 enters the temperature detection mode, and the T terminal enters the battery discrimination mode. Serial communication is performed in a state in which the motor 51 does not rotate. Although the serial communication is performed after the overdischarge has been detected in FIG. 16, a configuration in which, after the trigger switch 52 is turned OFF or when a switch for starting serial communication is operated in a case in which the switch for starting serial communication is provided, the voltage at the V terminal is switched to a low level may be adopted.

Figure 17:
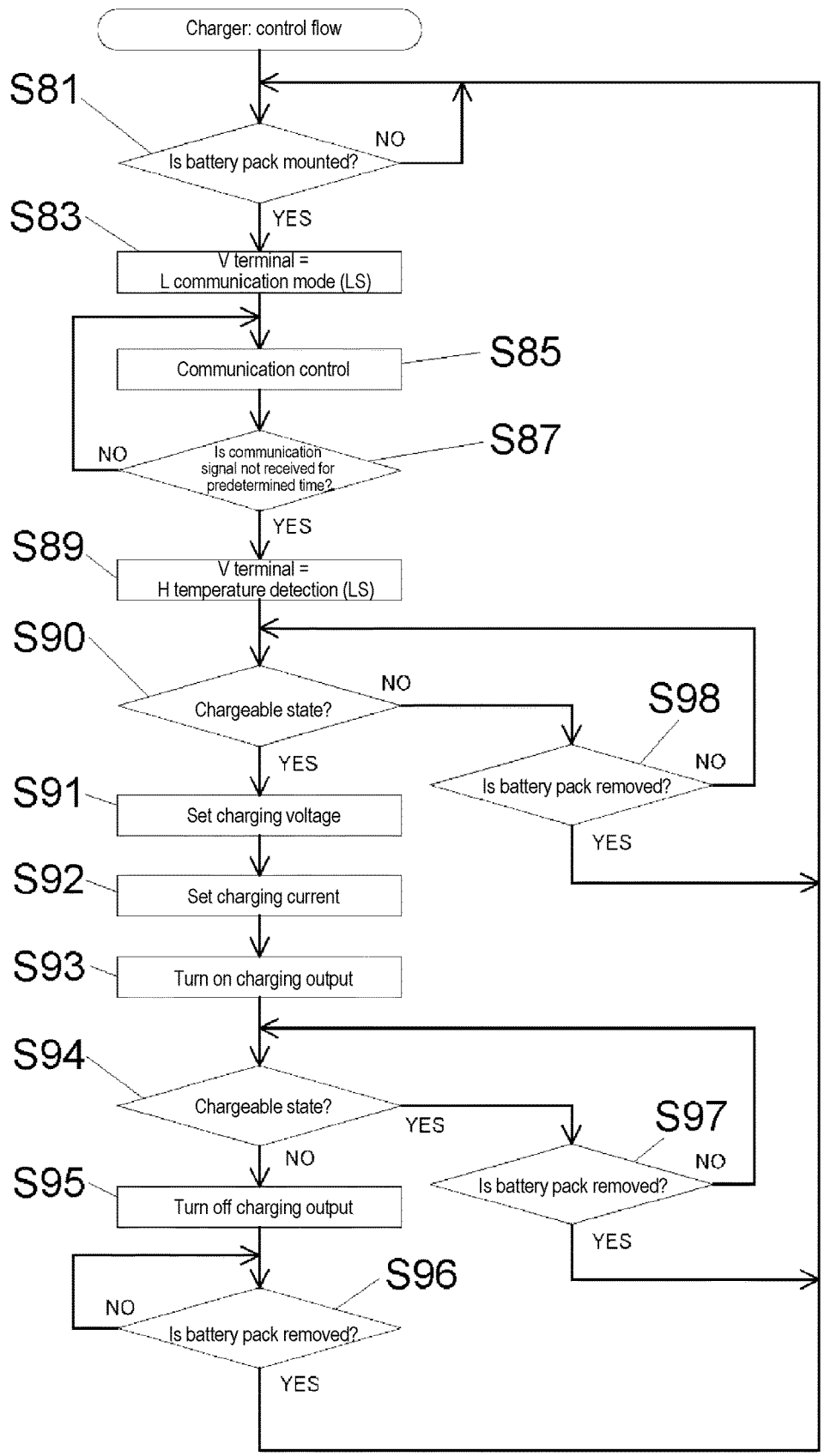
FIG. 17 is a control flowchart of the charger 70.

FIG. 17 is a control flowchart of the charger 70. When the battery pack 10 is connected (YES in S81), the control unit 75 outputs a low-level signal to the V terminal, switches the LS terminal to the communication mode (S83), and executes communication control (S85). The control unit 75 can recognize the connection of the battery pack 10 to the charger 70 from a voltage at the LS terminal or a voltage at the T terminal. When the control unit 75 does not receive a communication signal for a predetermined time (YES in S87), the control unit 75 outputs a high-level signal to the V terminal and switches the LS terminal to the temperature detection mode (S89). When the battery pack 10 is in a chargeable state (YES in S90), the control unit 75 sets a charging voltage on the basis of the voltage at the T terminal (the analog voltage indicating the identification information of the battery pack 10) or the identification information of the battery pack 10 obtained through serial communication (S91), sets a charging current (S92), and turns ON a charging output (starts supply of the charging current) (S93). The chargeable state is a state in which all of a condition that the battery pack 10 is mounted (a discrimination from the voltages at the LS terminal and the T terminal), a condition that no charge stop signal is transmitted from the battery pack 10 (a discrimination from the voltage at the LS terminal), a condition that the secondary battery cell 11 is not at an abnormally high temperature (a discrimination from the voltage at the LS terminal), a condition that the secondary battery cell 11 is a type of battery that can be charged by the charger 70 (a discrimination from the voltage at the T terminal), and a condition that the battery pack 10 is not fully charged (a discrimination from the voltage at the positive terminal) are satisfied. When the battery pack 10 is no longer in a chargeable state during charging of the battery pack 10 (NO in S94), the control unit 75 turns OFF the charging output (stops the supply of the charging current) (S95). In the determination as to the chargeable state in step S94, it is not necessary to check whether or not the secondary battery cell 11 is a type of battery that can be charged by the charger 70, unlike the discrimination in step S90. When battery pack 10 is removed (YES in S96, YES in S97, or YES in S98), the control unit 75 returns to step S81.

According to the embodiment, the following effects can be achieved.

(1) Since the serial communication is performed between the battery pack 10 and the electric tool 50 or the charger 70, it is possible to transmit and receive more detailed information, as compared with a case in which a voltage of the thermistor or a voltage of the identification resistor is only transmitted from the battery pack 10 to the electric tool 50 or the charger 70.

(2) Since both the LS terminal for transmitting the temperature information from the battery pack 10 to the electric tool 50 or the charger 70 and the T terminal for transmitting the identification information of the battery pack 10 are used in common for the serial communication, it is not necessary to provide dedicated terminals for serial communication, and it is possible to suppress an increase in the number of terminals and ensure compatibility with a battery pack or an electrical apparatus having no serial communication function.

(3) Since the function of the LS terminal of the battery pack 10 is switched between temperature information transmission and serial communication signal reception according to whether the electric tool 50 or the charger 70 sets the signal at the V terminal to a high level or a low level, it is possible to start communication at a timing convenient for the electric tool 50 or the charger 70 (for example, a timing when interference with other controls does not occur, or a timing when a noise of the motor 51 is not contained in the case of the electric tool 50). Since the battery pack 10 is used for various electrical apparatuses, significance of being able to start communication at different timings depending on the electrical apparatuses is great. Since the V terminal is a terminal used as a terminal for switching between the identification resistors Ra and Rb (switching between ON and OFF of the switching element Q2) and a terminal for setting the voltage at the LS terminal to a high level for the purpose of a charging stop instruction even when there is no serial communication function, and is not a dedicated terminal for switching between functions of the LS terminal, it is possible to suppress an increase in the number of terminals.

(4) For example, in a low-load electrical apparatus such as an accessory device (a radio, a lantern, or the like), since discharge to the same voltage as that of a high-load electrical apparatus such as an electric tool becomes deep discharge, an overdischarge threshold value greater than the overdischarge threshold value set in the battery pack 10 is set, and overdischarge is detected earlier than the battery pack 10. In an electric tool in which inconvenience is caused in operation when a voltage becomes low, such as an impact tool or a nailer, an overdischarge threshold value greater than the overdischarge threshold value set in the battery pack 10 is set, and overdischarge is detected earlier than the battery pack. In such a case, when the electric tool 50 notifies the battery pack 10 of the stop due to overdischarge and the battery pack 10 performs a remaining capacity display indicating overdischarge regardless of its own overdischarge threshold value as illustrated in FIG. 4, it is possible to suppress the occurrence of inconsistency that the remaining capacity display means 17 of the battery pack 10 displays that there is a remaining capacity even though the electric tool 50 has detected the overdischarge and stopped. Further, even when the electric tool 50 transmits the overdischarge threshold value to the battery pack 10 and the battery pack 10 performs a remaining capacity display according to the overdischarge threshold value transmitted from the electric tool regardless of its own overdischarge threshold value as illustrated in FIG. 9, it is possible to similarly suppress the occurrence of the inconsistency. Further, when the electric tool 50 transmits the overdischarge threshold value and the display threshold value to the battery pack 10 and the battery pack 10 performs a remaining capacity display according to the overdischarge threshold value and the display threshold value transmitted from the electric tool regardless of the own overdischarge threshold value and display threshold value as illustrated in FIG. 12, it is possible to match the remaining capacity display of the remaining capacity display means 17 of the battery pack 10 and the remaining capacity display of the remaining capacity display means 58 of the electric tool 50 with each other even before overdischarge occurs. Although not illustrated, the electric tool 50 may transmit the remaining capacity display itself (for example, the number of LEDs to be lit) to the battery pack 10 and the battery pack 10 may perform a remaining capacity display according thereto. In this case, it is also possible to match the remaining capacity display of the remaining capacity display means 17 of the battery pack 10 and the remaining capacity display of the remaining capacity display means 58 of the electric tool 50 with each other.

Figure 18:
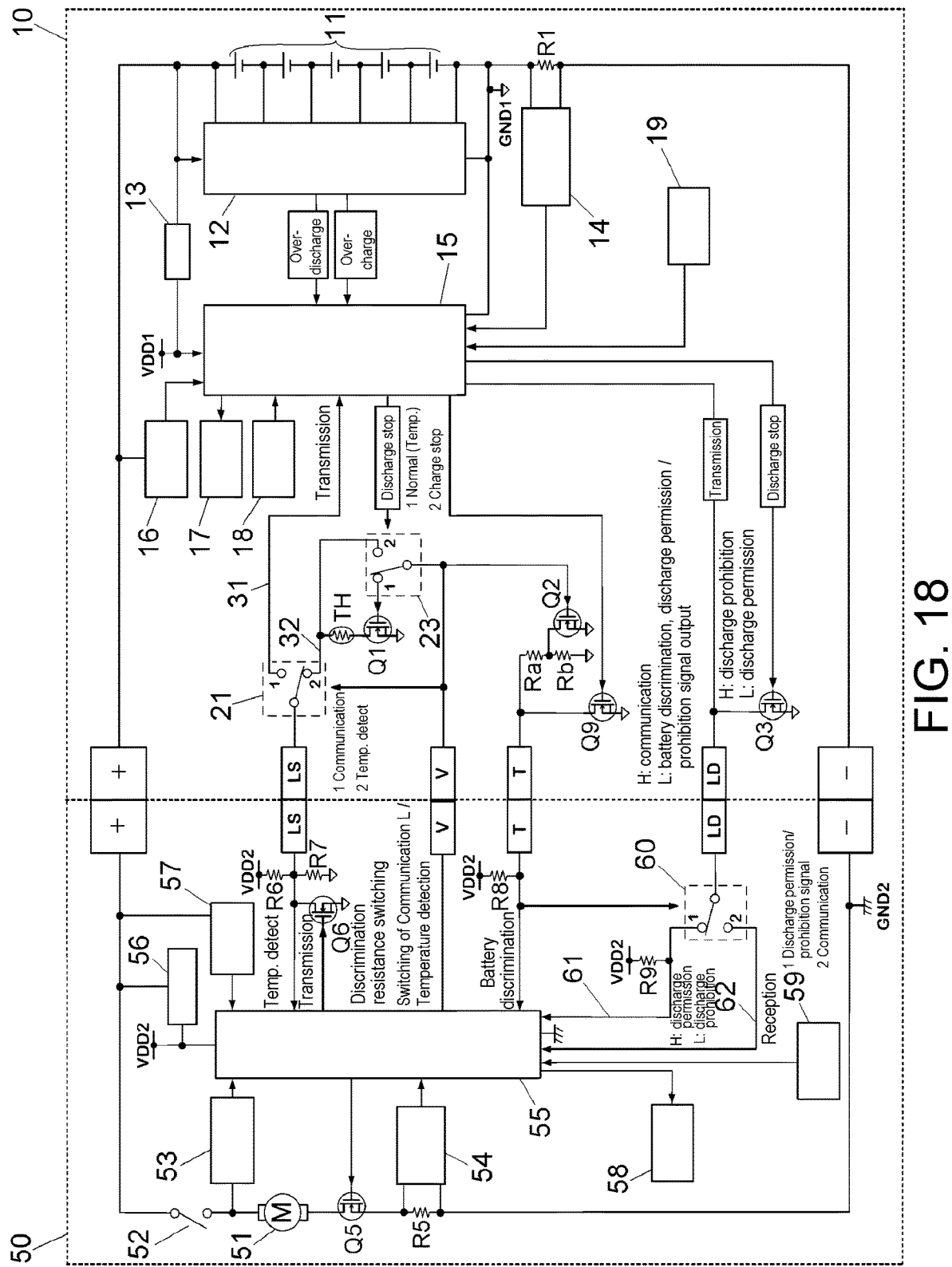
FIG. 18 is a block diagram of another embodiment of the present invention, and is a block diagram in a state in which a battery pack 10 is connected to an electric tool 50.

FIG. 18 is a block diagram of another embodiment of the present invention, and is a block diagram illustrating a state in which the battery pack 10 has been connected to the electric tool 50. Hereinafter, differences from FIG. 1 will be mainly described. The battery pack 10 includes a switching element Q9 such as an FET between the T terminal and the ground. A control terminal (a gate) of the switching element Q9 is connected to the control unit 15. In the electric tool 50, an LD terminal is selectively connected to either a serial communication reception circuit 62 or a discharge permission/prohibition signal reception circuit 61 via a fourth switching circuit 60. The fourth switching circuit 60 includes one terminal connected to the LD terminal, a control terminal connected to the T terminal, and the other terminal selectively connected to any one of the serial communication reception circuit 62 and the discharge permission/prohibition signal reception circuit 61 according to a signal input from the T terminal. Here, when the signal from the T terminal is at a low level, the other terminal of the fourth switching circuit 60 is connected to the serial communication reception circuit 62, and when the signal from the T terminal is at a high level, the other terminal of the fourth switching circuit 60 is connected to the discharge permission/prohibition signal reception circuit 61.

When the control unit 15 sets the signal input to the control terminal of the switching element Q9 to a high level, the voltage at the T terminal reaches a low level (a ground level), and the circuit of the LD terminal of the electric tool 50 is switched to the communication mode (a connection destination of the other terminal of the fourth switching circuit 60 is the serial communication reception circuit 62). Here, in the case of the communication mode, a voltage of the discharge permission/prohibition signal reception circuit 61 becomes indefinite, but the control unit 55 regards this as discharge permission and performs control. The control unit 55 receives the serial communication signal. When a response is required, the control unit 55 sets the signal to be output to the V terminal to a low level, switches the LS terminal to the communication mode, and responds to the serial communication signal. Discharge permission/prohibition is desired to be transferred to the battery pack 10, and the communication can be started at any timing in a discharge permission state. Even when the discharge is desired to be prohibited, there is no problem if the communication is interrupted and a discharge prohibition signal is output after the communication is started to detect ON of the trigger switch 52 or the motor current. For example, the control unit 15 can determine (set) that no communication is performed when the temperature of the secondary battery cell 11 is high, when a current is flowing, or when the voltage of the secondary battery cell 11 is low or high.

The present invention has been described above by taking the embodiments as an example, but it is understood by those skilled in the art that various modifications can be made to each component or each processing process of the embodiments within the scope defined the claims.

The invention claimed is:

1. An electrical apparatus comprising a battery pack, a device body connected to the battery pack, and a first terminal configured to send and/or receive an analog signal and a digital signal,
wherein when one of the device body and the battery pack transmits a predetermined signal to the other of the battery pack and the device body, the other of the battery pack and the device body is switched from one of the analog signal and the digital signal to the other of the analog signal and the digital signal and transmits a signal indicating an information of the other of the battery pack and the device body to one of the device body and the battery pack via the first terminal,
wherein the battery pack comprises:
a plurality of first communication circuits;
a first battery-side communication terminal selectively connected to any one of the plurality of first communication circuits;
a first switching circuit provided between the plurality of first communication circuits and the first battery-side communication terminal; and
a battery-side switching terminal connected to the first switching circuit,
wherein the first switching circuit switches among the plurality of first communication circuits to be connected to the first battery-side communication terminal according to the predetermined signal input from the battery-side switching terminal.

2. The electrical apparatus according to claim 1, wherein the device body includes a motor and a switch configured to switch between a driving and a stopping of the motor, and the one of the battery pack and the device body transmits the predetermined signal to the other of the battery pack and the device body at a timing when the switch is turned OFF.

3. The electrical apparatus according to claim 1,
wherein the predetermined signal is a signal for specifying an information in which the one of the device body and the battery pack requests the information from the other of the battery pack and the device body, and
when the other of the battery pack and the device body receives the predetermined signal, the other of the battery pack and the device body transmits a signal indicating the information specified by the predetermined signal among the information of the other of the battery pack and the device body to the one of the device body and the battery pack.

4. The electrical apparatus according to claim 1, wherein the battery pack comprises:
a battery-side control unit;
a plurality of second communication circuits;
a second battery-side communication terminal selectively connected to any one of the plurality of second communication circuits; and
a second switching circuit provided between the plurality of second communication circuits and the second battery-side communication terminal,
wherein the second switching circuit switches among the plurality of second communication circuits to be connected to the second battery-side communication terminal according to the predetermined signal input from the battery-side control unit.

5. The electrical apparatus according to claim 4,
wherein one of the plurality of first communication circuits is a circuit configured to output an analog voltage indicating an information of the battery pack or a reception circuit configured to receive a signal from an electrical apparatus,
one of the plurality of second communication circuits is a circuit configured to output an analog voltage indicating an information of the battery pack or a transmission circuit configured to transmit a signal to an electrical apparatus, and
the battery-side control unit determines a voltage to be input to the second switching circuit according to the signal received via the circuit.

6. The electrical apparatus comprising the battery pack according to claim 1 and a device body connected to the battery pack,
wherein the device body includes
a body-side control unit;
a first body-side communication terminal connected to the first battery-side communication terminal; and
a body-side switching terminal connected to the battery-side switching terminal, and
the body-side control unit inputs a signal to the first switching circuit via the body-side switching terminal and the battery-side switching terminal.

7. The electrical apparatus according to claim 1, comprising:
a plurality of communication circuits;
a body-side communication terminal selectively connected to any one of the plurality of communication circuits;
a switching circuit provided between the plurality of communication circuits and the body-side communication terminal; and
a body-side switching terminal connected to the switching circuit,
wherein the switching circuit switches among the plurality of communication circuits to be connected to the body-side communication terminal according to the predetermined signal input from the body-side switching terminal.

8. The electrical apparatus according to claim 7, wherein one of the plurality of communication circuits is a circuit configured to receive a discharge permission/prohibition signal from the battery pack.

9. The electrical apparatus according to claim 1, wherein the battery pack switches between control threshold values according to a signal received from the electrical apparatus to which the battery pack has been connected,
wherein the threshold value is a threshold value for an abnormality detection including at least one of an overdischarge threshold value, an overcurrent threshold value, and a high temperature protection threshold value of a battery cell, or a threshold value for switching between notifications of a remaining capacity of the battery pack.

10. The electrical apparatus according to claim 6,
wherein the device body transmits an abnormality detection signal when an abnormality has been detected, a signal of an information indicating that the device body has been stopped when the device body has been stopped due to the detection of the abnormality, or an abnormality information of the device body to the battery pack, and when the battery pack receives the signal or the abnormality information, the information is notified by the battery pack.

11. The electrical apparatus according to claim 10, wherein a reference value for an abnormality discrimination is different between the device body and the battery pack.

12. The electrical apparatus according to claim 6, wherein when an abnormality has been detected in one of the battery pack and the device body, the one or the other notifies that the abnormality has been detected, or the battery pack and the device body include a remaining capacity display unit configured to display a remaining capacity of the battery pack, wherein display states of both the remaining capacity display units are matched each other.

13. The electrical apparatus according to claim 1, wherein the predetermined signal is configured to input from the connected electrical apparatus via the battery-side switching terminal.

14. The electrical apparatus according to claim 1, wherein the battery pack is configured to be switched between inputting an information via the first battery-side communication terminal and outputting an information via the first battery-side communication terminal according to the predetermined signal.

15. A battery pack comprising:
a plurality of first communication circuits;
a first battery-side communication terminal selectively connected to any one of the plurality of first communication circuits;
a first switching circuit provided between the plurality of first communication circuits and the first battery-side communication terminal; and
a battery-side switching terminal connected to the first switching circuit,
wherein the first switching circuit switches among the plurality of first communication circuits to be connected to the first battery-side communication terminal according to the predetermined signal input from the battery-side switching terminal.

16. The battery pack according to claim 15, wherein,
the plurality of first communication circuit includes a first digital communication circuit and a first analog communication circuit configured to output an analog voltage indicating a first information of the battery pack,
the first battery-side communication terminal is electively connected to any one of the first digital communication circuit and the first analog communication circuit,
the first switching circuit is provided between the first digital communication circuit and the first analog communication circuit and the first battery-side communication terminal, and
the first switching circuit switches among the first digital communication circuit and the first analog communication circuit to be connected to the first battery-side communication terminal according to a predetermined signal input from the connected electrical apparatus via the battery-side switching terminal.

17. The battery pack according to claim 15, comprising:
a battery-side control unit;
a plurality of second communication circuits;
a second battery-side communication terminal selectively connected to any one of the plurality of second communication circuits; and
a second switching circuit provided between the plurality of second communication circuits and the second battery-side communication terminal,
wherein the second switching circuit switches among the plurality of second communication circuits to be connected to the second battery-side communication terminal according to the predetermined signal input from the battery-side control unit.

18. The battery pack according to claim 17,
wherein one of the plurality of first communication circuits is a circuit configured to output an analog voltage indicating an information of the battery pack or a reception circuit configured to receive a signal from an electrical apparatus,
one of the plurality of second communication circuits is a circuit configured to output an analog voltage indicating an information of the battery pack or a transmission circuit configured to transmit a signal to an electrical apparatus, and
the battery-side control unit determines a voltage to be input to the second switching circuit according to the signal received via the circuit.

19. A electrical apparatus comprising the battery pack according to claim 15 and a device body connected to the battery pack, wherein the device body includes:
a body-side control unit;
a first body-side communication terminal connected to the first battery-side communication terminal; and
a body-side switching terminal connected to the battery-side switching terminal, and
the body-side control unit inputs a signal to the first switching circuit via the body-side switching terminal and the battery-side switching terminal.

* * * * *